(12) United States Patent
Bae et al.

(10) Patent No.: US 10,672,097 B2
(45) Date of Patent: Jun. 2, 2020

(54) DISPLAY DRIVING CIRCUIT AND METHOD OF PARTIAL IMAGE DATA

(71) Applicant: Samsung Electronics Co., Ltd., Suwon-si, Gyeonggi-do (KR)

(72) Inventors: Jong Kon Bae, Seoul (KR); Dong Hwy Kim, Hwaseong-si (KR); Dong Kyoon Han, Seongnam-si (KR); Yo Han Lee, Seoul (KR); Han Yu Ool Kim, Seoul (KR); Matheus Farias Miranda, Suwon-si (KR); Tae Sung Kim, Seongnam-si (KR); Ho Jin Kim, Suwon-si (KR); Dong Hyun Yeom, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/743,899

(22) PCT Filed: Jul. 14, 2016

(86) PCT No.: PCT/KR2016/007658
§ 371 (c)(1),
(2) Date: Jan. 11, 2018

(87) PCT Pub. No.: WO2017/010822
PCT Pub. Date: Jan. 19, 2017

(65) Prior Publication Data
US 2018/0204303 A1 Jul. 19, 2018

(30) Foreign Application Priority Data

Jul. 14, 2015 (KR) .................. 10-2015-0099645
Jul. 14, 2016 (KR) .................. 10-2016-0089039

(51) Int. Cl.
*G06F 1/3234* (2019.01)
*G09G 3/3275* (2016.01)
(Continued)

(52) U.S. Cl.
CPC ............... *G06T 1/60* (2013.01); *G06F 1/163* (2013.01); *G06F 1/1626* (2013.01);
(Continued)

(58) Field of Classification Search
None
See application file for complete search history.

(56) References Cited

U.S. PATENT DOCUMENTS 5,621,429 A * 4/1997 Yamaashi ........... G06F 3/04845
345/428
5,696,531 A * 12/1997 Suzuki .................. G06T 3/0018
345/698
(Continued)

FOREIGN PATENT DOCUMENTS

EP         2 717 567 A1    4/2014
KR  10-2016-0058627 A     5/2016
(Continued)

*Primary Examiner* — Joni Hsu
(74) *Attorney, Agent, or Firm* — Jefferson IP Law, LLP

(57) ABSTRACT

An electronic device includes a display, a processor generating image data, a graphic random access memory (GRAM) storing the image data, and a display driver integrated circuit for driving the display. The display driver integrated circuit is configured to select a part of the image data and to output the selected part to a specified area of the display.

16 Claims, 16 Drawing Sheets

(51) Int. Cl.
   *G06T 1/60* (2006.01)
   *G09G 3/20* (2006.01)
   *G09G 5/36* (2006.01)
   *G06F 1/16* (2006.01)
   *G06F 3/14* (2006.01)
   *H04W 88/02* (2009.01)

(52) U.S. Cl.
   CPC ............. *G06F 1/3265* (2013.01); *G09G 3/20* (2013.01); *G09G 3/3275* (2013.01); *G09G 5/363* (2013.01); *G06F 3/14* (2013.01); *G09G 2310/04* (2013.01); *G09G 2330/021* (2013.01); *G09G 2330/022* (2013.01); *G09G 2340/02* (2013.01); *G09G 2340/0407* (2013.01); *G09G 2360/18* (2013.01); *G09G 2370/08* (2013.01); *H04W 88/02* (2013.01); *Y02D 10/153* (2018.01)

(56) References Cited

U.S. PATENT DOCUMENTS

| | | | |
|---|---|---|---|
| 7,446,774 | B1 | 11/2008 | MacInnis et al. |
| 7,583,985 | B2 | 9/2009 | Matson et al. |
| 7,659,900 | B2 | 2/2010 | MacInnis et al. |
| 8,275,423 | B2 | 9/2012 | Matson et al. |
| 8,467,837 | B2 | 6/2013 | Matson et al. |
| 8,659,608 | B2 | 2/2014 | MacInnis et al. |
| 9,007,426 | B2 | 4/2015 | Kramarenko et al. |
| 9,152,211 | B2 | 10/2015 | Gunn et al. |
| 9,152,212 | B2 | 10/2015 | Gunn |
| 9,153,166 | B2 | 10/2015 | Lombardi et al. |
| 9,158,372 | B2 | 10/2015 | Lombardi et al. |
| 9,310,874 | B2 | 4/2016 | Gunn et al. |
| 9,384,714 | B2 | 7/2016 | Takeda |
| 9,401,130 | B2 | 7/2016 | Gunn et al. |
| 9,640,100 | B2 | 5/2017 | Connell et al. |
| 2004/0228408 | A1* | 11/2004 | Roelens ............ H04N 5/783 375/240.12 |
| 2005/0215274 | A1 | 9/2005 | Matson et al. |
| 2006/0033744 | A1* | 2/2006 | Perez ............... H04M 1/73 345/502 |
| 2006/0103643 | A1* | 5/2006 | Mathew ............ G09G 3/3466 345/212 |
| 2007/0030276 | A1 | 2/2007 | MacInnis et al. |
| 2008/0158117 | A1* | 7/2008 | Wong .............. G09G 3/20 345/87 |
| 2009/0128572 | A1 | 5/2009 | MacInnis et al. |
| 2009/0298555 | A1 | 12/2009 | Matson et al. |
| 2010/0110106 | A1 | 5/2010 | MacInnis et al. |
| 2013/0017869 | A1 | 1/2013 | Matson et al. |
| 2014/0071477 | A1 | 3/2014 | Akazawa |
| 2014/0098182 | A1 | 4/2014 | Kramarenko et al. |
| 2014/0118272 | A1 | 5/2014 | Gunn |
| 2014/0120988 | A1 | 5/2014 | Gunn et al. |
| 2014/0122911 | A1 | 5/2014 | Gunn et al. |
| 2014/0281607 | A1* | 9/2014 | Tse ............... G06F 1/3287 713/320 |
| 2014/0333608 | A1* | 11/2014 | Okairi ............ G09G 3/3648 345/214 |
| 2014/0375704 | A1* | 12/2014 | Bi ................. G09G 3/3275 345/694 |
| 2015/0042572 | A1 | 2/2015 | Lombardi et al. |
| 2015/0054814 | A1 | 2/2015 | Takeda |
| 2015/0082255 | A1* | 3/2015 | DeVries ........... G06F 3/0488 715/863 |
| 2015/0235594 | A1 | 8/2015 | Lombardi et al. |
| 2015/0304785 | A1* | 10/2015 | Gan ............... H04R 29/00 381/56 |
| 2015/0370371 | A1* | 12/2015 | Azumi ............. G06F 3/044 345/174 |
| 2016/0049106 | A1 | 2/2016 | Connell et al. |
| 2016/0140893 | A1 | 5/2016 | Bae et al. |
| 2016/0155426 | A1 | 6/2016 | Gunn et al. |
| 2016/0246430 | A1* | 8/2016 | Wang .............. G06F 3/0416 |
| 2017/0116927 | A1 | 4/2017 | Bae et al. |
| 2017/0221451 | A1 | 8/2017 | Connell et al. |
| 2017/0308226 | A1 | 10/2017 | Yoo et al. |

FOREIGN PATENT DOCUMENTS

| | | |
|---|---|---|
| KR | 10-2017-0048957 A | 5/2017 |
| WO | 2016/025393 A1 | 2/2016 |
| WO | 2017/034126 A1 | 3/2017 |
| WO | 2017/183916 A1 | 10/2017 |

* cited by examiner

DISPLAY DRIVING CIRCUIT AND METHOD OF PARTIAL IMAGE DATA

TECHNICAL FIELD

The present disclosure relates to a display driver integrated circuit (DDI), a display driving method and an electronic device having the display driver integrated circuit.

BACKGROUND ART

With the development of mobile communication technologies, an electronic device changes to freely connect to a wireless/wired network and to be easily portable. For example, a portable electronic device, such as a smartphone, a tablet PC, or the like, may support various functions such as access to Internet, playback of multimedia content as well as voice and message communication functions.

In addition, an electronic device may be implemented in a type of a wearable device mounted on the body of a user. For example, the wearable device may be also implemented with a device such as a wrist watch worn on a wrist, glasses worn on the head of a user, or the like As described, an electronic device implemented in various types may generally include a display to visually provide a variety of content (e.g., an image, a video, and the like) to a user. The display includes a display panel and a display driver integrated circuit for driving the display panel.

DETAILED DESCRIPTION OF THE INVENTION

Technical Problem

A DDI installed to an electronic device may receive image data from a processor such that the DDI drives a display panel. For example, the DDI may display images on the display panel at a preset frame rate (e.g., 60 frames per second).

Thus, a processor generates image data for each frame of the entire display panel and provides the generated image data to the display panel through the DDI such that the electronic device dynamically and continuously provides useful information (e.g., time, the weather, news articles, or the like) to a user. Practically, since this corresponds to a video playback, the processor consumes relatively much power to generate much image data for a short time.

Meanwhile, the processor may not generate new image data to save power in a sleep or doze mode. Since new image data is not loaded to the DDI, the DDI may provide only the image corresponding to one frame previously stored. Thus, the electronic device may provide a fixed image in the sleep mode, but may not dynamically and continuously provide images.

Embodiments of the present disclosure may provide a DDI and a display driving method that are capable of specifying (or selecting) and outputting a part of the image data stored in a graphic random access memory (GRAM) itself without regard to the processor even when the electronic device is in a sleep mode, and an electronic device including the DDI.

Technical Solution

According to various embodiments of the present disclosure, an electronic device may include a display, a processor generating image data, a graphic random access memory (GRAM) storing the image data, and a display driver integrated circuit for driving the display. The display driver integrated circuit may be configured to select a part of the image data and to output the selected part to a specified area of the display.

According to various embodiments of the present disclosure, a display driver integrated circuit for driving a display may include a GRAM storing image data generated by a processor, a controller selecting a part of the image data, and a timing controller supplying an image signal corresponding to the selected part, to the display. The controller may be configured to control the timing controller such that the selected part is output to a specified area of the display.

According to various embodiments of the present disclosure, a method of driving a display may include storing, by a processor, image data in a GRAM, selecting, by a display driver integrated circuit, a part of the image data stored in the GRAM, and outputting, by the display driver integrated circuit, the selected part to a specified area of the display.

Other aspects, advantages, and salient features of the disclosure will become apparent to those skilled in the art from the following detailed description, which, taken in conjunction with the annexed drawings, discloses various embodiments of the present disclosure.

Advantageous Effects of the Invention

According to various embodiments of the present disclosure, the DDI may specify (or select) at least a part of image data (e.g., partial image data) stored in the GRAM and output the specified image data to the display panel. In this case, after providing the image data to the GRAM, the processor is maintained in the sleep mode without participating in the operation of the DDI. Therefore, an always-on-display (AOD) and self-display in which the processor does not participate may be implemented.

BEST MODE

Figure 1A:
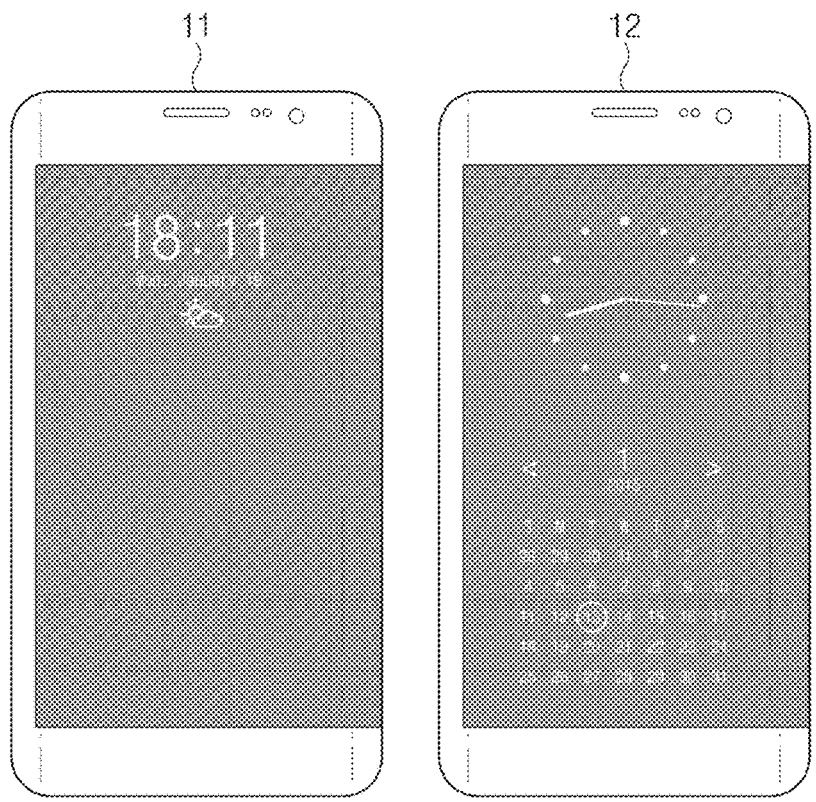
FIG. 1A illustrates a smartphone to which various embodiments of the present disclosure are applied.
Figure 1A:
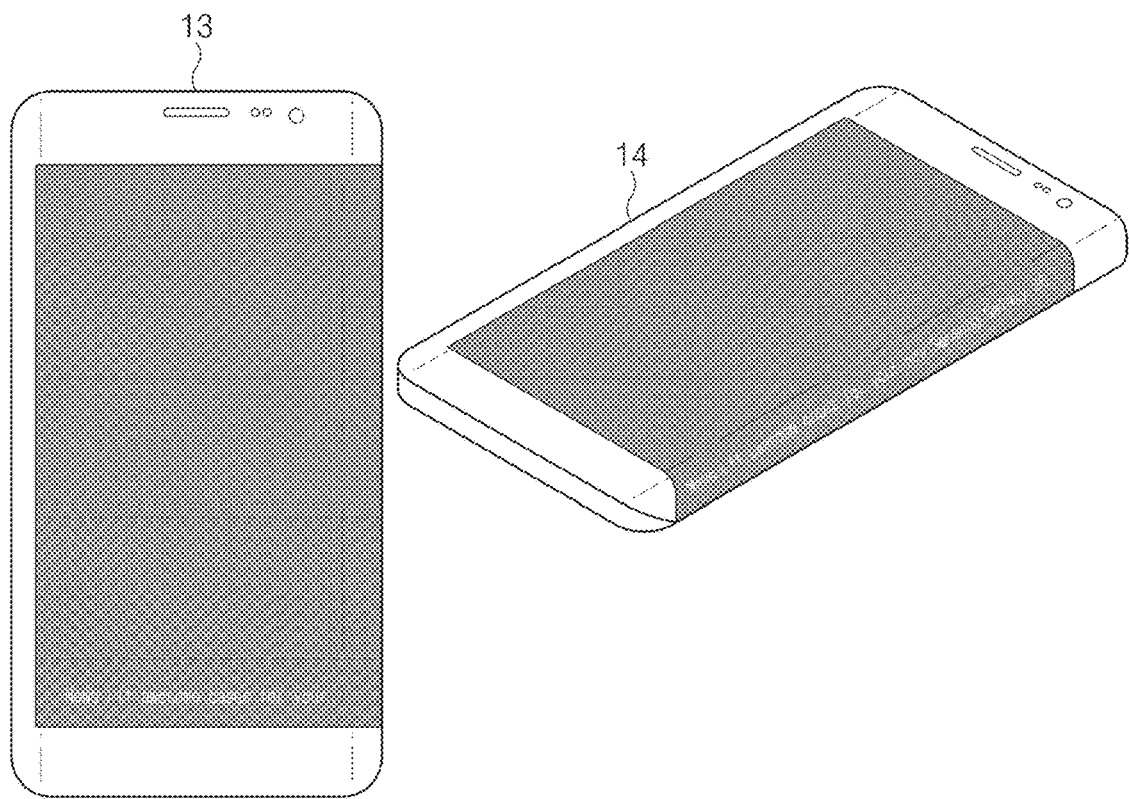

Hereinafter, various embodiments of the disclosure may be described with reference to accompanying drawings. The terms used in the present disclosure are intended to describe certain embodiments only, and are not considered limiting. Accordingly, those of ordinary skill in the art will recognize that modification, equivalent, and/or alternative on the various embodiments described herein can be variously made without departing from the scope and spirit of the disclosure. With regard to description of drawings, similar elements may be marked by similar reference numerals.

In the present disclosure disclosed herein, the expressions "have", "may have", "include" and "comprise", or "may include" and "may comprise" used herein indicate existence of corresponding features (e.g., elements such as numeric values, functions, operations, or elements) but do not exclude presence of additional features.

In the present disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the cases (1) where at least one A is included, the case (2) where at least one B is included, or the case (3) where both of at least one A and at least one B are included.

The terms, such as "first", "second", and the like used herein may refer to various elements of various embodiments of the present disclosure without regard to the order and/or importance and may be used to distinguish one element from another element, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other elements. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this specification are used to describe specified embodiments of the present disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include, for example, at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Audio Layer 3 (MP3) players, mobile medical devices, cameras, or wearable devices. According to various embodiments, the wearable device may include at least one of accessory types (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to an embodiment, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, a home automation control panel, a security control panel, TV boxes (e.g., Samsung HomeSync™, Apple TV™, or Google TV™), game consoles (e.g., Xbox™ and Play Station™), electronic dictionaries, electronic keys, camcorders, or electronic picture frames.

According to another embodiment, the electronic devices may include at least one of various medical devices (e.g., various portable medical measurement devices (e.g., a blood glucose monitoring device, a heartbeat measuring device, a blood pressure measuring device, a body temperature measuring device, or the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment may not be limited to the above-described electronic devices and may include other electronic devices and new electronic devices according to the development of technologies.

Hereinafter, electronic devices according to various embodiment of the present disclosure will be described with reference to the accompanying drawings. The term "user" used herein may refer to a person who uses an electronic device or may refer to a device (e.g., an artificial intelligence electronic device) that uses an electronic device.

FIG. 1A illustrates a smartphone to which various embodiments of the present disclosure are applied.

Referring to FIG. 1A, an electronic device to which various embodiments of the present disclosure are applied is shown. For example, the electronic device may include a smartphone 11, 12, 13, or 14. The electronic device may support a wake-up mode in which a user is capable of fully utilizing functions of the electronic device and a sleep mode in which a user is allowed to stand by.

In the wake-up mode, various hardware and/or software modules included in the electronic device may receive sufficient power (power required to allow all pixels to represent a set gradation color) from a battery so as to perform the functions. For example, a display may receive sufficient power in the wake-up mode to provide a variety of content required by a user. The processor may provide various functions of the electronic device base on sufficient power supply.

In the sleep mode, various hardware and/or software modules included in the electronic device may be inactive or may receive the minimum power to perform only a restricted function. For example, when the mode of a camera module switches to the sleep mode, the functions of taking a photograph and video may be inactivated. When the mode of the processor switches to the sleep mode, the processor may be configured to perform only a limited function of an application program. As such, since information processing or calculating of a hardware and/or software module is suppressed, a use time of a battery may be improved.

Each of the smartphones 11 to 14 shown in FIG. 1A may operate in the sleep mode. For example, the smartphone 11 operating in the sleep mode may output a digital clock showing the current time, a date, and weather onto a specified area in the display panel. Similarly, the smartphone 12 may output an analog watch showing the current time and a calendar showing the current date onto a specified area in the display panel. In addition, the smartphone 13 operating in a vertical display mode (so-called a portrait mode) may output news article onto a specified area (e.g., a lower end of the display panel) of the display panel in a sleep mode. The smartphone 13 operating in a horizontal display mode (so-called a landscape mode) may output a news article onto a specified area (e.g., a curved area prepared on a side surface of the electronic device) in the display panel.

In the smartphones 11 to 14 operating in the sleep mode, each of the pixels used for displaying a current time, a date, weather and a news article output onto each display panel may have a specified color, and the remaining pixels may be configured to have a specified color (e.g., black). For example, when the display panel is an OLED panel, the remaining pixels may be turned off.

Figure 1B:
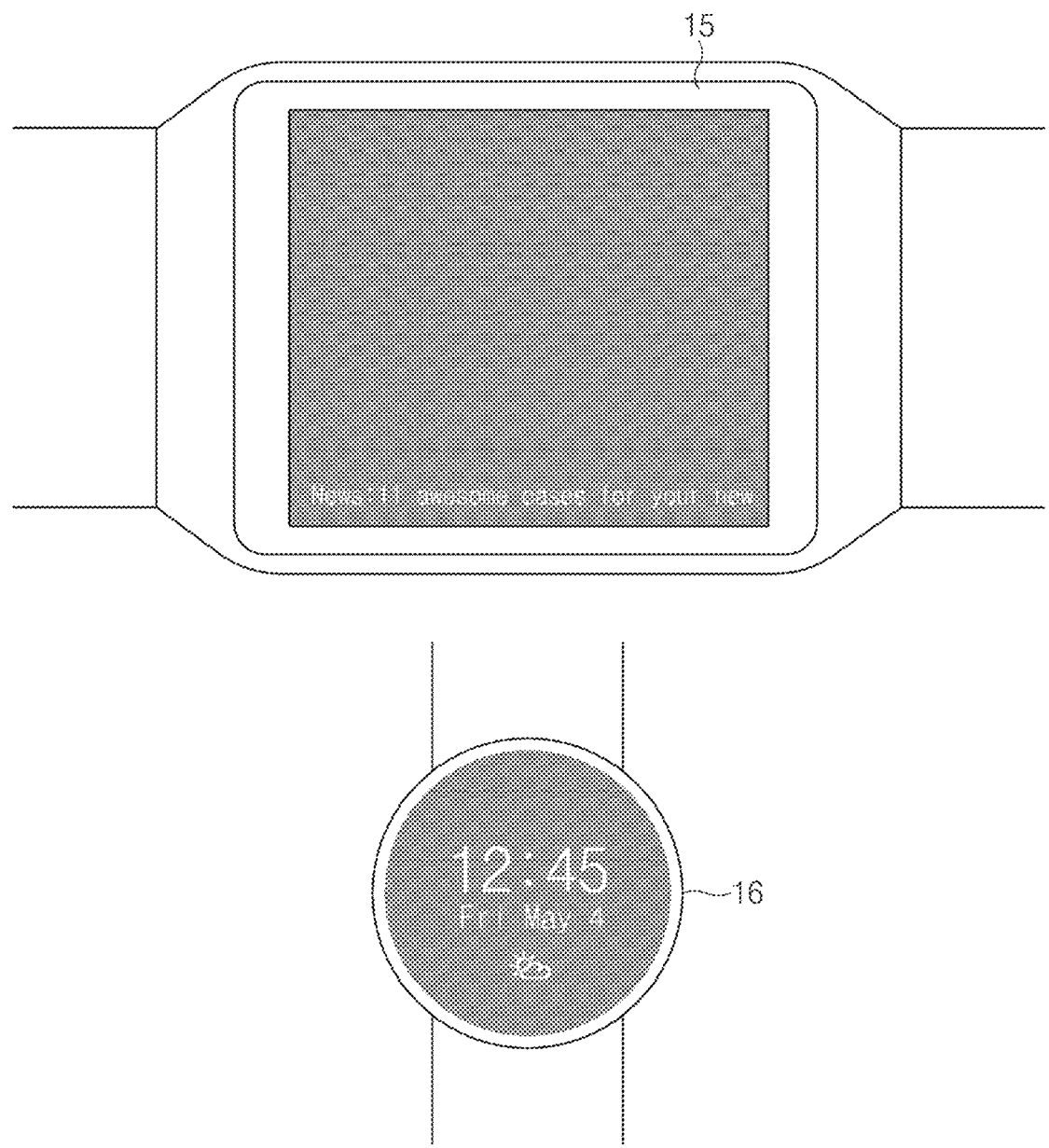
FIG. 1B is a view illustrating a smart watch to which various embodiments of the present disclosure are applied.

FIG. 1B is a view illustrating a smart watch to which various embodiments of the present disclosure are applied.

Referring to FIG. 1B, the electronic device according to various embodiment of the present disclosure may include, for example, a smart watch 15 or 16. The smart watch 15 or 16 may support the wake-up and sleep modes similarly to the smartphones 11 to 14.

All the smart watches 15 and 16 shown in FIG. 1B may operate in the sleep mode. For example, the smart watch 15 operating in the sleep mode may output a news article onto a specified area (e.g., one side area of the display panel) in the display panel. In addition, the smart watch 16 operating in the sleep mode may output a digital clock, a date, and weather onto a specified area (e.g., the entire area of the display panel) in the display panel.

In the smart watches 15 and 16, the pixels used for displaying a current time, a date, weather, and a news article output onto each display panel may have a specified color, and the remaining pixels may have a black color. For example, in the case where the display panel is an OLED panel, the remaining pixels may be turned off.

As described above, the electronic devices according to various embodiments of the present disclosure may provide useful information (e.g., a time, a date, weather, news, or the like) to a user on the display panel while operating in the sleep mode. The electronic device operating in the sleep mode may switch to the wake-up mode in response to a user input (e.g., a pushing of a home-button, a pushing of a power button, a touch on a touch panel, or the like).

In the case where the smartphones 11 to 14 and the smart watches 15 and 16 provide useful information, since the smartphones 11 to 14 and the smart watches 15 and 16 operate in the sleep mode, the calculation load of each processor may be significantly reduced. In addition, in the case where the display panel is an OLED panel, since only the pixels for outputting the useful information are turned on, the power consumed for outputting the useful information may be minimized. Thus, the whole battery power consumption may be also suppressed as much as possible.

Figure 2:
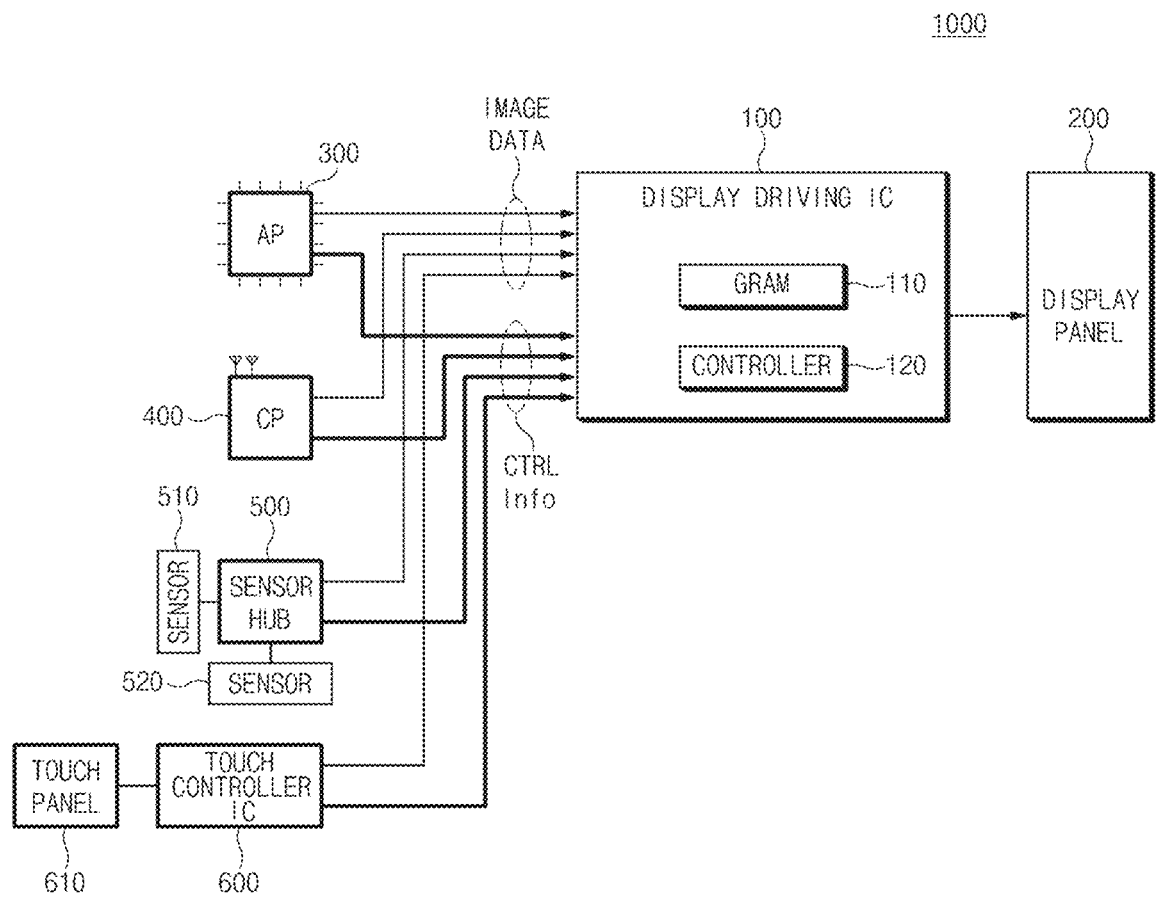
FIG. 2 illustrates a block diagram of the electronic device, according to an embodiment of the present disclosure.

The display outputting method described above may be referred to as "AOD" in an aspect that useful information is always provided. In addition, the display outputting method may be referred to as a self-display in an aspect that the display is performed by the operation of the DDI itself without any participation of the processor. To implement the AOD or the self-display, the electronic device may include a configuration as shown in FIG. 2. In detail, the electronic device may include a DDI as configured in FIG. 3A or 3B.

FIG. 2 illustrates a block diagram of the electronic device, according to an embodiment of the present disclosure.

Referring to FIG. 2, an electronic device 1000 according to an embodiment of the present disclosure includes a DDI 100, a display panel 200, a processor (e.g., application processor (AP) 300, a communication processor (CP) 400, a sensor hub 500, and a touch controller IC 600).

The DDI 100 may drive the display panel 200. In the present disclosure, the outputting of image data to "display" may be referred to as interchangeably as "the outputting of image data to the display panel 200. The DDI 100 may provide an image signal corresponding to image data received from a processor (host) (e.g., the AP 300, the CP 400, the sensor hub 500, or the touch controller IC 600) to the display panel 200 at a preset frame rate.

The DDI 100 according to an embodiment may include at least one GRAM 110 and a controller 120. (For a more detailed description of the DDI 100, refer to FIGS. 3A and 3B).

The GRAM 110 may store image data from the processor (e.g., the AP 300, the CP 400, the sensor hub 500, and/or the touch control IC 600) therein. The GRAM 110 may include a memory space corresponding to a resolution and/or the number of color gradations of the display panel 200. The GRAM 110 may be referred to as a "frame buffer" or a "line buffer".

Figure 6A:
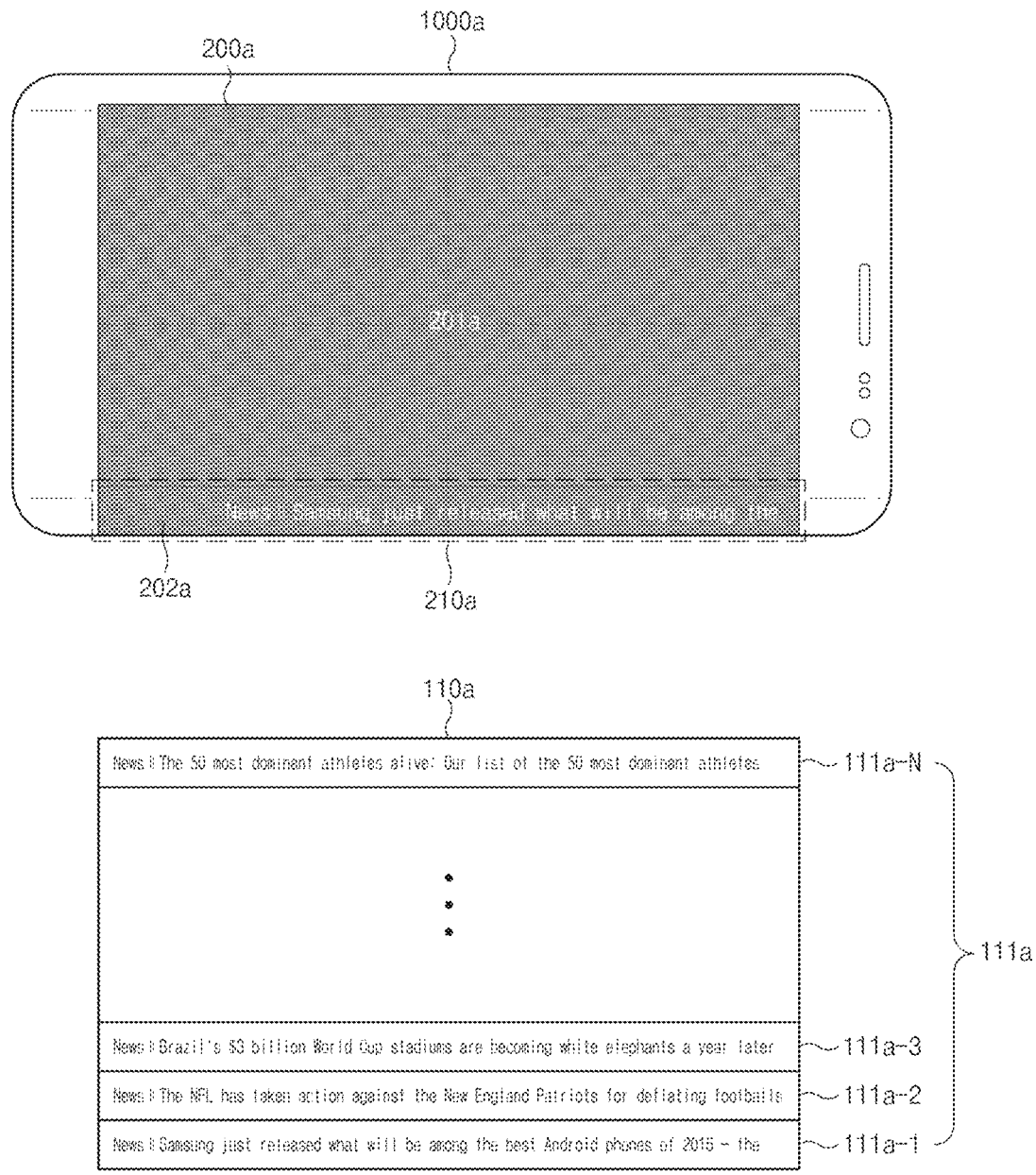
FIG. 6A illustrates an example in which a display driving method is applied to a smartphone, according to an embodiment of the present disclosure.
Figure 6B:
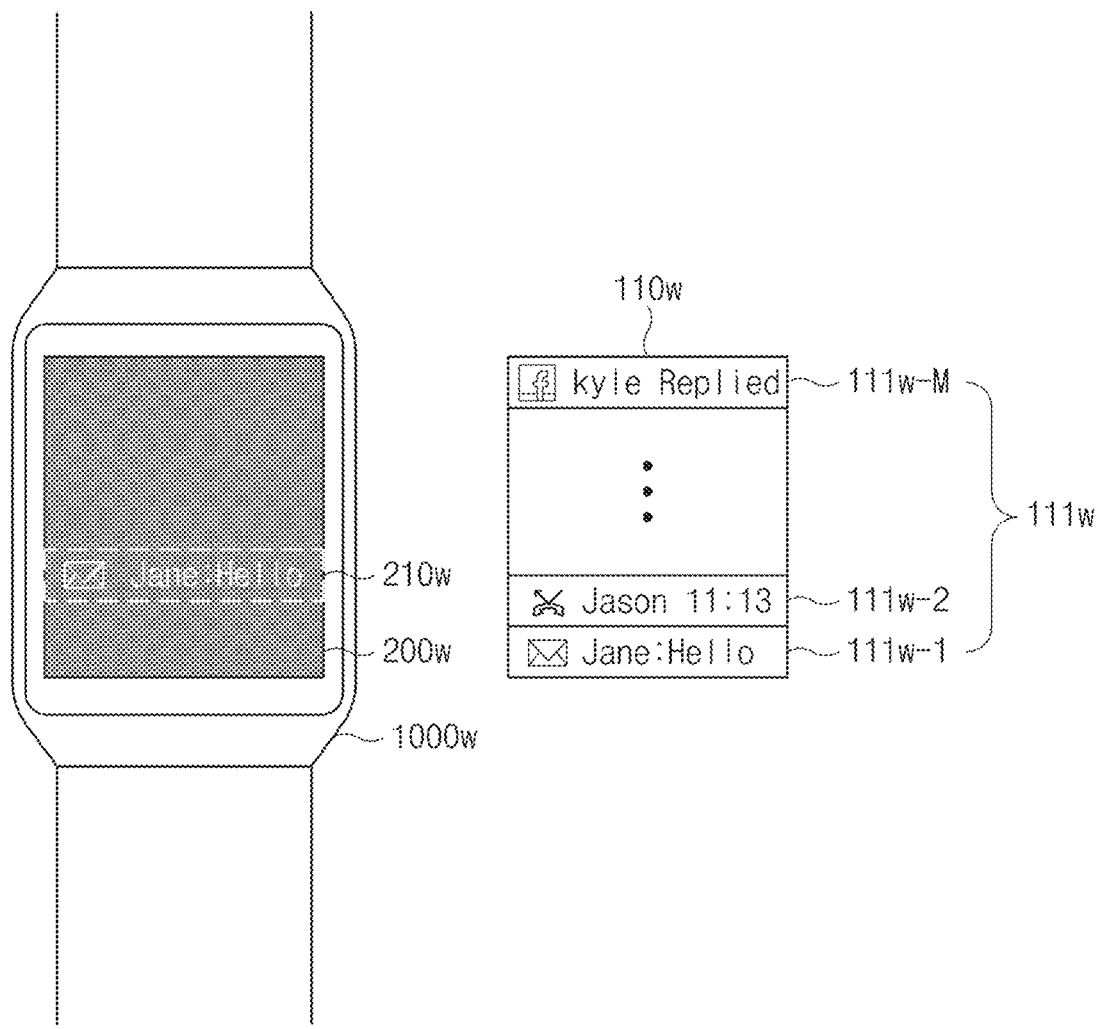
FIG. 6B illustrates an example in which a display driving method is applied to a smart watch, according to an embodiment of the present disclosure.

For example, the image data may correspond to one piece of image data formed by concatenating pieces of independent partial image data (e.g., GRAM 110*a* of FIG. 6A, GRAM 110*w* of FIG. 6B, and GRAM 110*c* of FIG. 8). For another example, the image data may include at least one low-resolution image data having a resolution lower than the resolution of the display panel 200. In addition, according to an embodiment, the image data may be stored in the GRAM 110 after being encoded in the specified manner by the processor (e.g., the AP 300, the CP 400, the sensor hub 500, or the touch controller IC 600).

The controller 120 may be configured to select a part of image data stored in the GRAM 110 and to output the selected part to a specified area of the display panel 200. At this time, the controller 120 may output the selected part to the specified area of the display panel 200 depending on the operation of the DDI 100. Meanwhile, in the present disclosure, it is understood that operations performed by the controller 120 are the operations that the DDI 100 performs.

For example, the DDI 100 (of the controller 120 thereof) may be configured to select at least one of pieces of partial image data stored in the GRAM 110 and to output the selected at least one partial image data to the display panel 200. At this time, when selecting the partial image data to be output, the controller 120 may use a data address on the GRAM 110 and/or the size of the (partial) image data to be output. For example, the controller 120 of the DDI 100 may select image data, which corresponds to the specified data size based on a specific data address, as the image data to be output.

According to an embodiment, the DDI 100 (or the controller 120 thereof) may output two or more pieces of partial image data to different areas. For example, a first group of partial image data and a second group of partial image data may be stored in the GRAM 110. In this case, the DDI 100 (or the controller 120 thereof) may select at least one partial image data among the first group of partial image data and at least one partial image data among the second group of partial image data. Afterwards, the DDI 100 (or the controller 120 thereof) may output at least one partial image data selected among the first group of partial image data to a first area of the display panel 200, and may output at least one partial image data selected among the second group of partial image data to a second area of the display panel 200.

According to an embodiment, the DDI 100 (or the controller 120 thereof) may change at least one partial image data to be output to the specified area of the display panel 200, depending on a preset sequence. That is, the DDI 100 (or the controller 120 thereof) may sequentially select one of pieces of partial image data stored in the GRAM 110, depending on a specified sequence (or a random sequence) and may output the selected one to the specified area of the display panel 200. Thereby, a specific animation effect may be achieved.

For example, the controller 120 may modify partial image data depending on the specified sequence by sequentially shifting a start data address of partial image data scan-read from the GRAM 110 at a preset interval and period. According to various embodiments, the preset interval and period may be set based on a user's settings.

For example, in the case where the first group of partial image data and the second group of partial image data are stored in the GRAM 110, the DDI 100 (or the controller 120 thereof) may select and output one of the second group of partial image data (or the first group of partial image data) depending on the specified sequence.

According to an embodiment, the processor may generate image data, may encode the generated image data in a specified scheme (e.g., a Display Stream Compression (DSC) scheme specified by Video Electronics Standards Association (VESA)), and may store the encoded image data in the GRAM 110. Since the data size of the image data is reduced by the encoding, one or two or more pieces of encoded image data may be stored in the GRAM 110. For example, if the data size is reduced by '1/n' times by the encoding, 'n' pieces of encoded image data may be stored in the GRAM 110.

The DDI 100 (or the controller 120 thereof) may select a part of (pieces of) encoded image data stored in the GRAM 110, may decode the selected part, and may output the decoded data to the specified area of the display panel 200. since two or more (e.g., 'n') images having the size corresponding to the display panel 200 are included in the GRAM 110 in the compressed form by the encoding, the range of an image that the DDI 100 (or the controller 120 thereof) is capable of selecting may increase n times.

According to an embodiment, the processor may generate image data, the resolution of which is lower than the resolution of the display panel 200, and may store the generated low-resolution image data in the GRAM 110. Since the size of the low-resolution image data is smaller than the size of image data corresponding to the whole resolution of the display panel 200, one or two or more pieces of low-resolution image data may be stored in the GRAM 110 in the concatenated form. For example, 'm' pieces of image data, the resolution each of which is reduced to 1/m compared with the resolution of the display panel 200 may be stored in the GRAM 110 in the concatenated form.

The DDI 100 (or the controller 120 thereof) may select a part of the one or two or more pieces of low-resolution image data and may enlarge the selected part at a specified magnification, and may output the enlarged part to the specified area of the display panel 200. Since two or more (e.g., m) pieces of low-resolution image data are included in the GRAM 110, various images may be output to the display panel 200 by only the operation of the DDI 100.

According to an embodiment, the DDI 100 (or the controller 120 thereof) may be configured to select and output a part of image data stored in the GRAM 110 based on control information received from the processor of the DDI 100 (e.g., the AP 300, the CP 400, the sensor hub 500, or the touch controller IC 600). The control information may include information about a data address on the GRAM 110 and/or a size of partial image data to be output.

For example, the processor (e.g., the AP 300) may provide the data address and/or the data size corresponding to a digit and a symbol concerned with the "digital watch" to the controller 120 of the DDI 100 as the control information.

The controller 120 may select and output the image data of the digit and symbol concerned with the "digital watch" stored in the GRAM 110 based on the data address and/or data size.

According to an embodiment, the DDI 100 (or the controller 120 thereof) may be configured to output a part of the selected image data (e.g., the selected partial image data) dynamically. For example, the controller 120 may continuously provide the selected image data by shifting the selected pieces of (partial) image data in units of blocks by using a timing controller not shown (so-called panel self-refresh). Image effects such as fade-in and fade-out effects may be achieved by continuously providing the (partial) image data. For example, when the partial image data to be output is a news article, an effect similar to a news ticker scrolled in one direction may be achieved.

The display panel 200 may display various kinds of information (e.g., multimedia data or text data) for a user. The display panel 200 may include, for example, a liquid-crystal display (LCD) panel, an active-matrix organic light-emitting diode (AM-OLED) panel, or the like. For example, the display panel 200 may be implemented to be flexible, transparent, or wearable. Also, the display panel 200 may be included in, for example, a cover of a case electrically coupled to the electronic device 1000.

The display panel 200 may be supplied with an image signal corresponding to image data from the display driver integrated circuit 100 to display a screen associated with the image data. A plurality of data lines and a plurality of gate lines may cross each other on the display panel 200 and a plurality of pixels may be disposed in areas formed between the data and gate lines crossing each other. In the case where the display panel 200 is an OLED panel, each pixel may include at least one switching device (e.g., FET) and one OLED. Each pixel may receive the image signal from the DDI 100 in predetermined timing to generate light.

In the present disclosure, the "processor" may include the AP 300, the CP 400, the sensor hub 500, and/or the touch control IC 600. According to various embodiments, the processor may be referred to as a "host".

Generally, for example, the AP 300 may receive a command from other elements through an internal bus, may decode the received command, and may perform an arithmetic operation or data generating and processing according to the decoded command.

The CP 400 may manage a data link in communication between other electronic devices connected with the electronic device 1000 over a network and may execute a function to change a communication protocol. The CP 400 may provide the user with communication services such as a voice call, a video call, a text message (e.g., SMS, MMS, or the like), packet data, and the like.

The sensor hub 500 may include a micro controller unit (MCU) to control at least one sensor 510 or 520. For example, the sensor hub 500 may collect sensing information detected by various sensors 510 and 520 and may control the various operations of the sensors 510 and 520. For example, each of the sensors 510 and 520 may include a temperature/humidity sensor, a biometric sensor, a barometric sensor, a gyro sensor, or the like.

For example, the touch control IC 600 may control a touch panel 610 correspondingly coupled to the display panel 200. For example, the touch control IC 600 may process touch gesture information input from the touch panel 610, or may control an operation of the touch panel 610. The touch control IC 600 may include a driver circuit, a sensor circuit, control logic, an oscillator, a delay table, an analog-digital converter, an MCU, and the like.

According to an embodiment of the present disclosure, the processor (e.g., the AP 300, the CP 400, the sensor hub 500, or the touch controller IC 600) may generate image data according to various embodiments and may provide the generated image data to the DDI 100 (or the GRAM 110 thereof). For example, the image data may include image data in which pieces of partial image data are concatenated, or image data in which pieces of low-resolution image data having a resolution lower than the resolution of the display panel 200 are concatenated. According to another embodiment, after encoding the generated image data in the specified scheme, the processor may provide the encoded image data to the DDI 100 (or the GRAM 110 thereof).

According to an embodiment, after providing the image data to the DDI 100, the processor may be configured to enter a sleep mode. That is, the processor does not participate in the operation of the DDI 100 after storing the image data in the GRAM 110 of the DDI 100 (other than the transmitting of control information for selecting a part of image data).

In addition, according to an embodiment, the processor may provide the image data to the GRAM 110 of the DDI 100 through a high-speed serial interface (HiSSI) such as a mobile industry processor interface (MIPI). Furthermore, the processor may transmit the control information for selecting a part of image data through a low speed serial interface (LoSSI), for example, a serial peripheral interface (SPI) or inter-integrated circuit (I2C).

For example, the AP 300 may generate the image data to be output through the display panel 200. For example, when the AP 300 obtains data on a news article through a network, the AP 300 may generate text images concerned with the content of the news article as the image data to be output through the display panel 200.

For example, the AP 300 may transmit the data addresses on the GRAM 110 of the text images corresponding to the content of the news article to the DDI 100 through the LoSSI as the control information. The DDI 100 may output the image concerned with the content of the news article to the specified area of the display panel 200 depending on the control information.

In addition, the CP 400 may generate image data to be output through the display panel 200 based on various communication services. For example, when a text message is received, the CP 400 may generate an icon of the text massage and text images concerned with the content of the text massage as image data to be output through the display panel 200.

For example, the CP 400 may transmit the data addresses on the GRAM 110 of the icon and text images to the DDI 100 through the LoSSI as the control information. The DDI 100 may output the text message icon and text images to the display panel 200.

In addition, for example, the sensor hub 500 may generate the image data to be output through the display panel 200 based on the sensing information sensed by the sensors 510 and 520. For example, when temperature information is received from a temperature sensor, the sensor hub 500 may generate a numerical image corresponding to a temperature value and an image corresponding to a temperature value unit as the image data to be output through the display panel 200.

For example, the sensor hub 500 may transmit the data addresses on the GRAM 110 of the numerical image corresponding to a temperature value and the image corresponding to the temperature value unit to the DDI 100 through the LoSSI as the control information. The DDI 100 may output the numerical image corresponding to the temperature value and the image corresponding to the temperature value unit to the display panel 200.

In addition, for example, the touch control IC 600 may generate the image data to be output through the display panel 200 based on the touch sensing information detected by the touch panel 610. For example, when the touch gesture information is received from the touch panel 610, the touch controller IC 600 may generate an image corresponding to the touch gesture information as the image data to be output through the display panel 200.

For example, the touch controller IC 600 may transmit the data addresses on the GRAM 110 of the determined image data to the DDI 100 through the LoSSI as the control information. The DDI 100 may output the images corresponding to the touch gesture information to the display panel 200 according to the control information.

Meanwhile, the host providing image data and control information is not limited to various types of the processors (e.g., the AP 300, the CP 400, the sensor hub 500, or the touch control IC 600). For example, the DDI 100 may be configured to receive image data and/or control information from a GPS module (not shown).

Figure 3A:
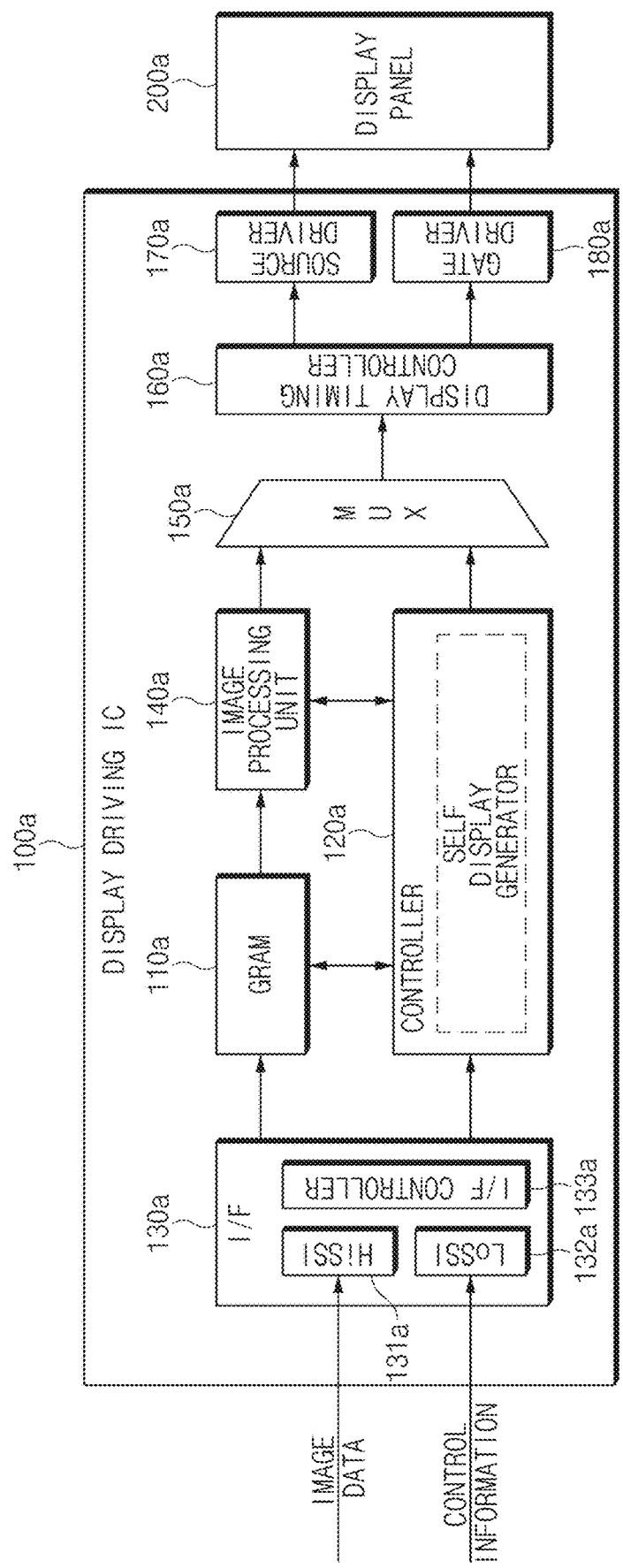
FIG. 3A is a block diagram of a DDI, according to an embodiment of the present disclosure.

FIG. 3A is a block diagram of a DDI, according to an embodiment of the present disclosure.

Referring to FIG. 3A, the DDI 100*a* according to an embodiment of the present disclosure may include a GRAM 110*a*, a controller 120*a*, an interface module 130*a*, an image processing unit 140*a*, a multiplexer (MUX) 150*a*, a display timing controller (T-con) 160*a*, a source driver 170*a*, and a gate driver 180*a*.

Although not illustrated in FIG. 3A, according to various embodiments, the DDI 100*a* may further include an oscillator, a module to adjust the number of frames (or a frame frequency), a module to apply pixel power, or the like. In addition, according to various embodiments, while not included in the DDI 100*a*, the source driver 170*a* and the gate driver 180*a* may be implemented in the form to which a display panel is coupled. Meanwhile, the details the same as those in FIG. 2 will be omitted.

The GRAM 110*a* may store the image data received from a processor (e.g., the AP 300, the CP 400, the sensor hub 500, or the touch controller IC 600) through the interface module 130*a*. The GRAM 110*a* may include a memory space corresponding to a resolution and/or the number of color gradations of the display panel 200*a*.

The controller 120*a* may be configured to select a part of image data stored in the GRAM 110*a* and to control the display timing controller 160*a* such that the selected part is output to the specified area of the display panel 200*a*. The controller 120*a* may be referred to as "control logic". In addition, a circuit for performing the display driving method of the present disclosure therein (i.e., a self-display generator) may be embedded in the controller 120*a*.

The interface module 130*a* may receive image data and/or control information from the outside (e.g., the AP 300, the CP 400, the sensor hub 500, or the touch controller IC 600). The interface module 130*a* may include an Rx-side HiSSI 131*a* capable of receiving the image data, an Rx-side LoSSI 132*a* capable of receiving the control information, and an interface controller 133*a* that controls the Rx-side HiSSI 131*a* and the Rx-side LoSSI 132*a*.

The image processing unit 140*a* may improve an image quality of the image data. Although not shown in FIG. 3A, the image processing unit 140*a* may include a pixel data processing circuit, a pre-processing circuit, and a gating circuit.

The MUX 150*a* may multiplex signals output from the image processing unit 140*a* and the controller 120*a* to transmit the multiplexed signal to the display timing controller 160.

Under control of the controller 120*a*, the display timing controller 160*a* may receive image data multiplexed by the MUX 150*a* and may generate a data control signal for controlling the operation timing of the source driver 170*a* and a gate control signal for controlling the operation timing of the gate driver 180*a*. According to an embodiment, the display timing controller 160*a* may be implemented to be included in the controller 120*a*.

The source and gate drivers 170*a* and 180*a* may generate signals, which are provided to scan and data lines (not shown) of the display panel 200*a*, based on the source and gate control signals received from the display timing controller 160*a*, respectively.

Figure 3B:
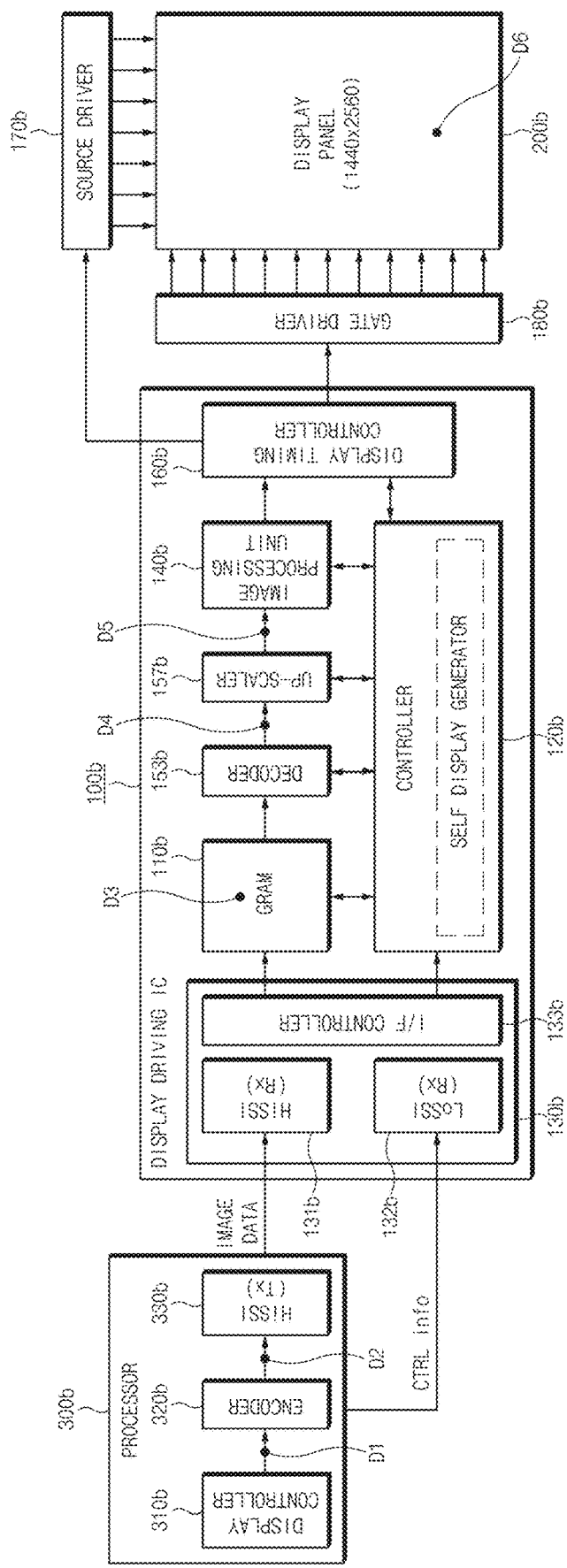
FIG. 3B illustrates a block diagram of an electronic device including a DDI, according to another embodiment of the present disclosure.

FIG. 3B illustrates a block diagram of an electronic device including a DDI, according to another embodiment of the present disclosure.

Referring to FIG. 3B, an electronic device according to an embodiment of the present disclosure may include a DDI 100*b*, a display, and a processor 300*b*. In the descriptions of FIG. 3B, the details the same as those in FIG. 3A will be omitted.

The display may include a source driver 170*b*, a gate driver 180*b*, and a display panel 200*b*. The DDI 100*b* may include a GRAM 110*b*, a controller 120*b*, an interface module 130*b*, an image processing unit 140*b*, a decoder 153*b*, an up-scaler 157*b*, and a display timing controller 160*b*. In addition, the processor 300*b* (e.g., the AP 300, the CP 400, the sensor hub 500, or the touch controller IC 600 illustrated in FIG. 2) may include a display controller 310*b*, an encoder 320*b*, and a Tx-side HiSSI 330*b*.

The display controller 310*b* of processor 300*b* may generate image data. According to an embodiment, the image data may include image data in which pieces of partial image data are concatenated. For example, the pieces of partial image data may include a first group of partial image data, a second group of partial image data, or more pieces of partial image data. According to an embodiment, the display controller 310*b* may include low-resolution image data having a resolution (e.g., 1/m of the resolution of the display panel 200*b*) lower than the resolution of the display panel 200*b* or may generate image data in which two or more (e.g., m) pieces of low-resolution image data are concatenated (D1, refer to 1010 of FIG. 10).

The encoder 310*b* of the processor 300*b* may encode image data generated by the display controller 310, in a specified scheme (e.g., DSC scheme specified by VESA). As such, since the image data generated by the display controller 310*b* is compressed, the data size may be reduced (D2, refer to 1020 of FIG. 10) For example, the size of the image data generated by the display controller 310*b* may be reduced to 1/n by the encoding. According to various embodiments, the encoder 310*b* may be omitted. That is, the image data may be transmitted to the DDI 100*b* without encoding or compression.

The processor 300*b* may transmit the image data encoded by the encoder 310*b* to the DDI 100*b* through the Tx-side HiSSI 330*b*. Furthermore, the processor 300*b* may transmit control information for selecting or controlling an image to be output to the display panel 200*b*, to the DDI 100*b* through a Tx-side LoSSI (not shown).

The DDI 100*b* may receive the encoded image data and the control information from the processor 300*b* through the interface module 130. For example, the encoded image data may be received through an Rx-side HiSSI 131*b* under control of the interface controller 133*b*, and the control information may be received through an Rx-side LoSSI 132*b* under control of the interface controller 133*b*.

The GRAM 110*b* may store the at least one encoded image data received through the Rx-side HiSSI 131*b*. For example, if the image data is compressed to 1/n by the encoder 320*b* of the processor 300*b*, 'n' pieces of encoded image data may be stored in the GRAM 110*b* (D3, refer to 1030 of FIG. 10). In addition, according to various embodiments, the encoded image data may include at least one (e.g., two or more) encoded low-resolution image data.

The controller 120*b* may select a part of image data stored in the GRAM 110*b*. For example, in the case where the image data stored in the GRAM 110*b* is encoded, the controller 120*b* may select a part of the encoded image data (D3, refer to 1031 and 1032 of FIG. 10).

According to an embodiment, in the case where pieces of partial image data are stored in the GRAM 110*b*, the controller 120*b* may select at least one of the pieces of partial image data. At this time, in the case where a first group of partial image data and a second group of partial image data (or more pieces of partial image data) are stored in the GRAM 110*b*, the controller 120*b* may select at least one partial image data of the first group of partial image data and at least one partial image data of the second group of partial image data.

According to another embodiment, in the case where the image data stored in the GRAM 110*b* includes at least one low-resolution image data (i.e., image data, the resolution of which is lower than the resolution of the display panel 200*b*), the controller 120*b* may select a part of low-resolution image data.

The interface module 130*b* may receive image data and control information from the processor 300*b*. The interface module 130*b* may include the Rx-side HiSSI 131*b* capable of receiving the image data, the Rx-side LoSSI 132*b* capable of receiving the control information, and an interface controller 133*b* that controls the Rx-side HiSSI 131*b* and the Rx-side LoSSI 132*b*.

The image processing unit 140*b* may improve an image quality of the image data. The image processing unit 140*b* may include a pixel data processing circuit, a pre-processing circuit, a gating circuit, and the like.

Figure 10:
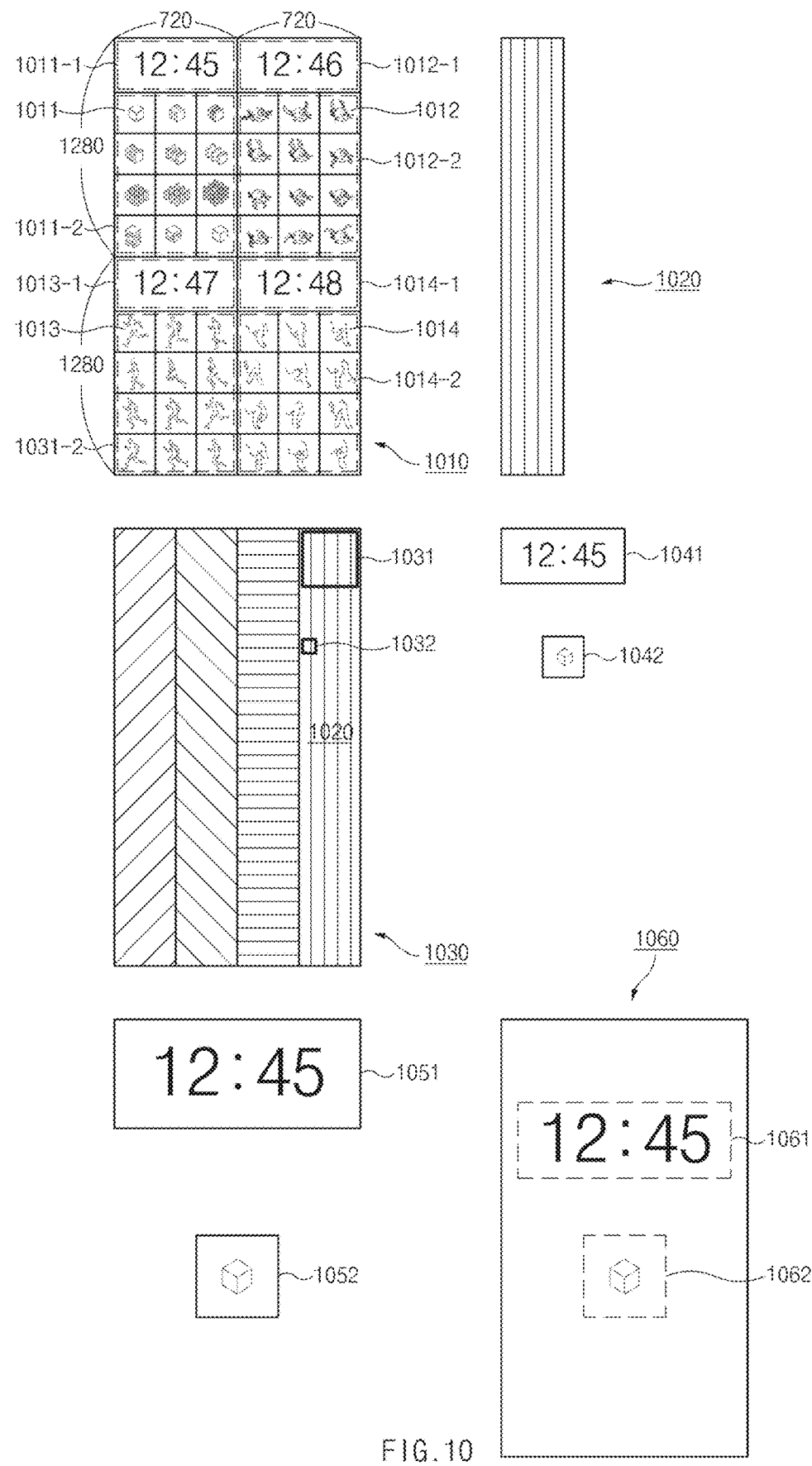
FIG. 10 is a view for describing an output of image data, according to an embodiment of the present disclosure.

In the case where a part of image data selected by the controller 120*b* is encoded, the decoder 153*b* may decode the selected part in the specified scheme and may transmit the decoded data to the display timing controller 160*b* (D4, refer to 1041 and 1042 of FIG. 10). For example, if the size of image data is compressed to 1/n by the encoder 310*b* of the processor 300*b*, the decoder 153*b* may decompress the selected part and then may restore the image data before the compression.

The up-scaler 157*b* and/or the image processing unit 140*b* may be interposed between the decoder 153*b* and the display timing controller 160*b*. According to various embodiments, in the case where the selected part is not encoded by the controller 120*b*, the decoder 153*b* may be omitted or may be bypassed.

The up-scaler 157*b* may enlarge an image at a specified magnification. According to an embodiment, in the case where the part selected by the controller 120*b* is a low-resolution image or in the case where there is a need to be enlarged depending on user settings, the up-scaler 157*b* may enlarge the selected part (D5, refer to 1051 and 1052 of FIG. 10). For example, the part selected by the controller 120*b* may be enlarged at the specified magnification.

The image data enlarged by the up-scaler 157*b* may be transmitted to the display timing controller 160*b*. At this time, the image processing unit 140*b* may be interposed between the up-scaler 157*b* and the display timing controller 160*b*. According to various embodiments, in the case where a part of image data selected by the controller 120*b* does not require enlargement, the up-scaler 157*b* may be omitted or may be bypassed.

The display timing controller 160*b* may convert the image data, which is received from the GRAM 110*b* through the decoder 153*b*, the up-scaler, and/or the image processing unit 140*b*, into an image signal and may supply the image signal to a display (e.g., the source driver 170*b* or the gate driver 180*b*).

According to an embodiment, under control of the controller 120*b*, the display timing controller 160*b* may transmit an image signal corresponding to the part selected by the controller 120*b* to the display (e.g., the source driver 170*b* or the gate driver 180*b*). As such, the selected part of image data may be output to the specified area of the display panel 200*b* (D6, refer to 1060 of FIG. 10).

For example, in the case where the controller 120*b* selects at least one partial image data among pieces of partial image data stored in the GRAM 110*b*, the display timing controller 160*b* may generate an image signal corresponding to the selected at least one partial image data to transmit the image signal to the display (e.g., the source driver 170*b* or the gate driver 180*b*).

For another example, in the case where the controller 120*b* selects at least one among the first group of partial image data stored in the GRAM 110*b* and selects at least one among the second group of partial image data, the display timing controller 160*b* may generate the corresponding image signal to transmit the image signal to the display (e.g., the source driver 170*b* or the gate driver 180*b*). As such, the at least one partial image data selected among the first group of partial image data may be output to a first area of the display panel 200*b*, and the at least one partial image data selected among the second group of partial image data may be output to a second area of the display panel 200*b*.

The display according to an embodiment may include the source driver 170*b*, the gate driver 180*b*, and the display panel 200*b*.

The source and gate drivers 170*b* and 180*b* may generate electrical signals, which are provided to scan and data lines (not shown) of the display panel 200*b* based on image signals received from the display timing controller 160*a*, respectively.

The display panel 200*b* may provide a user with various images based on the electrical signals received from the source driver 170*b* and the gate driver 180*b*. The display panel 200*b* may have, for example, a resolution of wide quad high definition (WQHD) (2560×1440).

It is illustrated in FIG. 3B that the encoder 320*b* and the decoder 153*b* corresponding to the encoder 320*b* are respectively included in the processor 300*b* and the DDI 100*b* and the up-scaler 157*b* is included in the DDI 100*b*. However, according to various embodiments, at least one of the encoder 320*b*, the decoder 153*b*, and the up-scaler 157*b* may be omitted or may be implemented with a part of the controller 120*b*.

Figure 4:
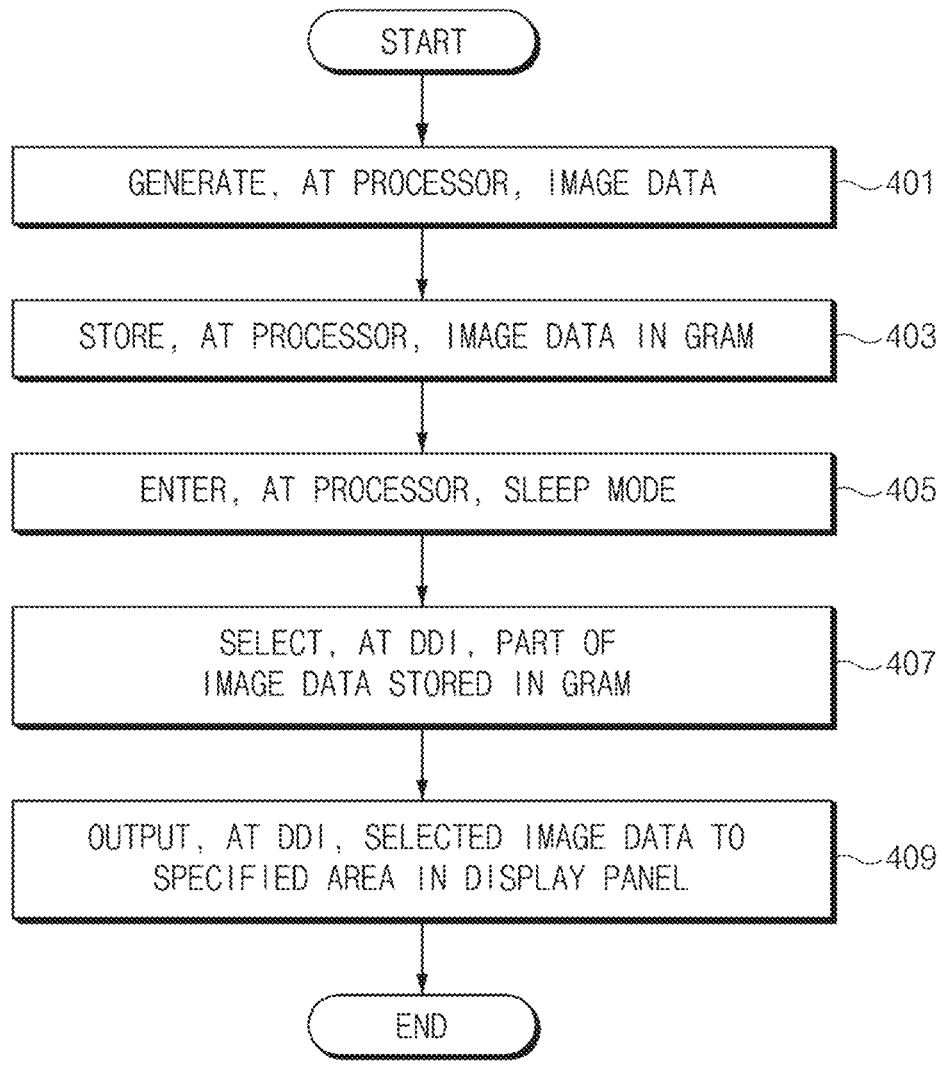
FIG. 4 is a flowchart illustrating a display driving method according to an embodiment of the present disclosure.

FIG. 4 is a flowchart illustrating a display driving method according to an embodiment of the present disclosure.

Referring to FIG. 4, a display driving method according to an embodiment of the present disclosure may include operation 401 to operation 409. The description of FIG. 4 may be given by using the reference numerals of FIG. 2.

In operation 401, a processor (e.g., the AP 300, the CP 400, the sensor hub 500, and/or the touch control IC 600) may generate image data. According to an embodiment, the processor may generate image data in which the pieces of partial image data are concatenated with each other.

In operation 403, the processor may store the image data generated in operation 401, in the GRAM 110. In the case where the image data includes the pieces of partial image data, predetermined data addresses may allocated to the pieces of partial image data, respectively.

In operation 405, if the processor stores the image data in the GRAM 110, the processor may enter a sleep mode. Thus, the processor may not participate in the operation of the DDI 100.

In operation 407, the DDI 100 may select a part of the image data stored in the GRAM 110. According to an embodiment, the DDI 100 may select at least one piece of partial image data among the pieces of partial image data.

In operation 409, the DDI 100 may output the partial image data selected in operation 407 to a specified area in the display panel 200. That is, the DDI 100 may output a part (e.g., partial image data) of the image data to the specified area of the display panel 200 by the operation of the DDI 100.

In addition, according to an embodiment, the controller 120 may dynamically output the selected image data in operation 409. For example, the controller 120 may continuously provide the selected image data to a user by shifting the specified (partial) image data in units of blocks.

According to the DDI 100 of various embodiments of the present disclosure, only a part (partial image data) of the image data stored in the GRAM 110 may be selected to be displayed. In addition, according to an embodiment, since the part of the image data may be shifted at a clock period of the oscillator embedded in the DDI 100 to be output, a dynamic effect may be added to the output of the partial image data.

In addition, according to various embodiments, after providing the image data, the processor (e.g., the AP 300, the CP 400, the sensor hub 500, and/or the touch control IC 600) may not participate in the operation of the DDI 100 and then, the electronic 100 and the processor may be maintained in the sleep mode. Thus, the power consumed for driving the processor and the HiSSI 131 may be minimized. In addition, since the partial image data may be dynamically output to the display panel 200, a panel persistence effect due to the operation of a specified pixel for a long time may be improved.

Figure 5:
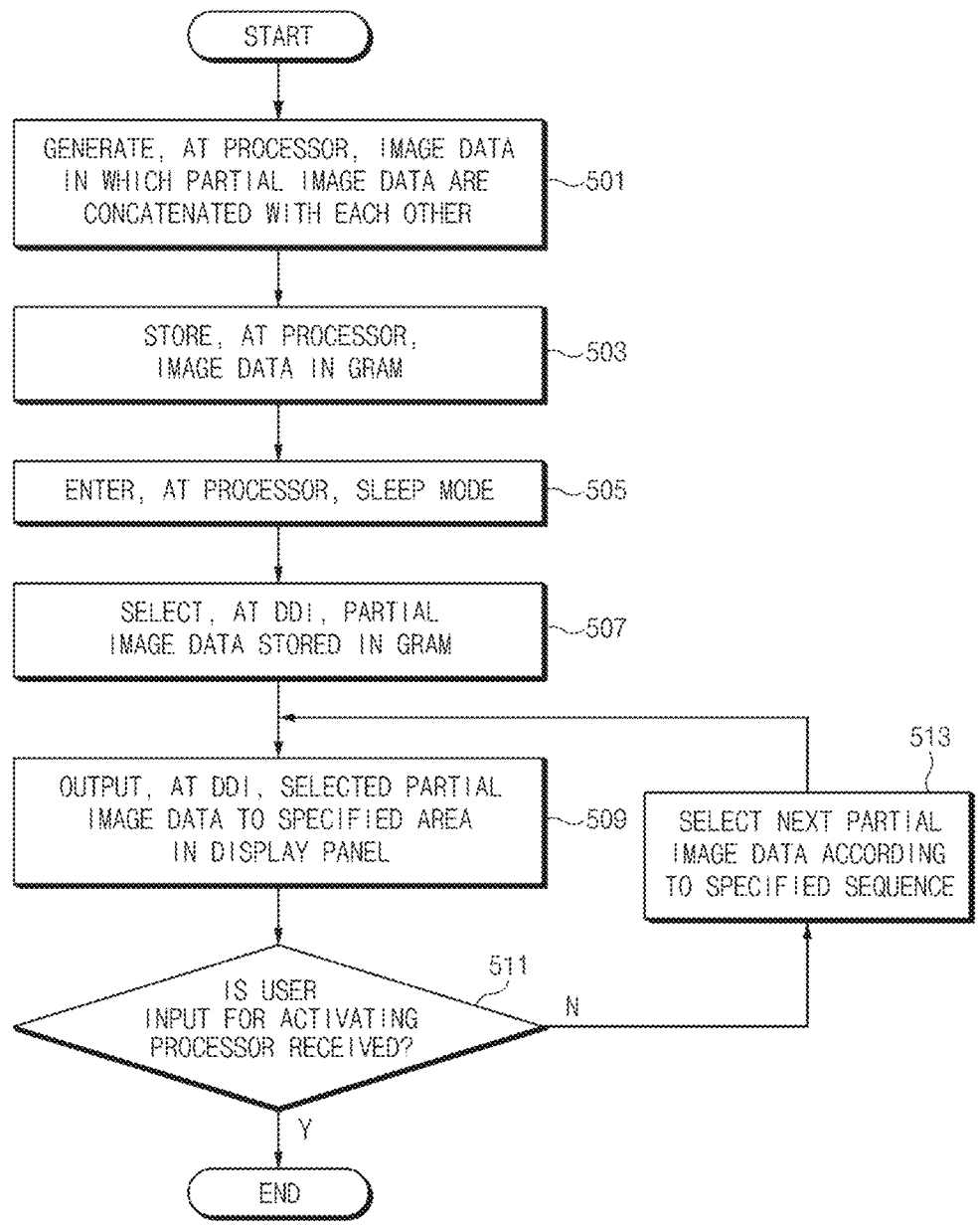
FIG. 5 is a flowchart illustrating a process of providing image data in a specified sequence according to an embodiment of the present disclosure.

FIG. 5 is a flowchart illustrating a process of providing image data in a specified sequence according to an embodiment of the present disclosure.

Referring to FIG. 5, a display driving method according to an embodiment of the present disclosure may include operation 501 to operation 513. The display driving method shown in FIG. 5 will be described with reference to FIGS. 6A and 6B. In addition, the same parts as those of FIG. 4 will be omitted.

In operation 501, the processor (e.g., the AP 300, the CP 400, the sensor hub 500, and/or the touch control IC 600) may generate image data in which the pieces of partial image data are concatenated with each other. For example, the processor of the smartphone 1000a may generate one piece of image data 111a in which 'N' pieces of partial image data 111a-1 to 111a-N are concatenated with each other. In addition, referring to FIG. 6B, the processor of the smart watch 1000w may generate one piece of image data 111w in which 'M' pieces of partial image data 111w-1 to 111w-M are concatenated with each other.

In operation 503, the processor may store the image data generated in operation 501, in the GRAM 110. In the case where the image data includes the pieces of partial image data, predetermined data addresses may allocated to the pieces of partial image data, respectively.

For example, referring to FIG. 6A, the data addresses on the GRAM 110a may be allocated to the 'N' pieces of partial image data 111a-1 to 111a-N of the image data 111a stored in the GRAM 110a, respectively. The data addresses may be allocated to the 'N' pieces of partial image data 111a-1 to 111a-N by an interval between the partial image data.

In addition, referring to FIG. 6B, the data addresses on the GRAM 110w may be allocated to the 'N' pieces of partial image data 111w-1 to 111w-M of the image data 111w stored in the GRAM 110b, respectively. The data addresses may be allocated to the 'M' pieces of partial image data 111w-1 to 111w-M by an interval between the partial image data.

In operation 505, if the processor stores the image data (e.g., the image data 111a and 111w of FIGS. 6A and 6B) are stored in the GRAM 110, the electronic device 1000 and the processor may enter the sleep mode.

In operation 507, the DDI (the controller 120 thereof) 100 may select at least one piece of partial image data among the image data stored in the GRAM 110.

For example, referring to FIG. 6A, the DDI 100 may select the partial image data 111a-1 from the image data 111a stored in the GRAM 110a by using a data address and/or a data size. In addition, referring to FIG. 6B, the DDI 100 may select the partial image data 111w-1 from the image data 111w stored in the GRAM 110b by using a data address and/or a data size.

In operation 509, the DDI 100 may output the partial image data selected in operation 507 to a specified area in the display panel 200. According to an embodiment, the DDI 100 may dynamically output the selected image data.

For example, referring to FIG. 6A, the DDI 100 may scan-read the partial image data 111a-1 selected in operation 507 to output the specified area 210a. The smartphone 1000a shown in FIG. 6A may include the display panel 200a. The display panel 200a may include a main display panel area 201a (which is a flat display panel area provided on a top surface of the smartphone 1000a) and a sub-display panel area 202a (which is a curved display panel area provided on a side surface of the smartphone 1000a). The specified area 210a may correspond to at least a part of the sub-display panel area 202a. According to an embodiment, the DDI 100 may dynamically output the partial image data 111a-1 to the specified area 210a.

For example, information (i.e., News ∥ Samsung just released what will be among the best Android phones of 2015) corresponding to the partial image data 111a-1 may be output while moving from right to left of the sub-display area 202a. In this case, the main display panel area 201a of the display panel 200a may be output in black. In the case where the display panel 200a is an OLED panel, the pixels of the display area may be turned off.

In addition, referring to FIG. 6B, the DDI 100 may output the partial image data 111w-1 to the specified area 210w of the display panel 200w. The specified area 210b may be disposed on a lower end area of the display panel 200w.

According to an embodiment, the DDI 100 may dynamically output the partial image data 111w-1 to the specified area 210w. For example, the information (that is, an icon representing a message and at least a part of the message content) corresponding to the partial image data 111w-1 may be output while moving from right to left of the specified area 210w. Similarly to that of FIG. 6A, the remaining area of the display panel 200w other than the specified area 210w may be output in black. In the case where the display panel 200w is an OLED panel, the pixels of the remaining area of the display panel 200w other than the specified area 210w may be turned off.

In operation 511, the electronic device 1000 may determine whether a user input for activating the processor is received. That is, the electronic device 1000 may determine whether a user input for allowing the electronic device 1000 to switch from the sleep mode to the wake-up mode is received. For example, the user input may include a pushing of a home-button, a push of a power button, and a touch on a touch panel. When the user input is received, the electronic device may terminate the display driving method according to an embodiment of the present disclosure and the mode may switch to the wake-up mode. To the contrary, when the user input is not received, the electronic device may perform operation 513.

In operation 513, the DDI 100 of the electronic device may modify the selected partial image data in a preset sequence.

For example, referring to FIG. 6A, the DDI 100 may output partial image data in sequence of the partial image data 111a-1 to 111a-N. After outputting the partial image data 111a-N, the DDI 100 may output the partial image data 111a-1 to the specified area 210a again. Since the pieces of partial image data 111a-1 to 111a-N are sequentially displayed on the specified area 210a, an effect similar to a news ticker scrolled in one direction may be achieved.

In addition, referring to FIG. 6B, the DDI 100 may output partial image data in sequence of the partial image data 111w-1 to 111w-M. After outputting the partial image data 111w-M, the DDI 100 may output the partial image data 111w-1 to the specified area 210w again. Since the pieces of partial image data 111w-1 to 111w-M are sequentially displayed on the specified area 210w, a user may receive notification information of the smart watch 1000w even though any operations are not performed.

Meanwhile, although the smartphone 1000a operating in a landscape mode has been described in FIG. 6A, the smartphone 1000a may operate in a portrait mode like the smartphone 13 of FIG. 1A. In addition, the smart watch 1000w operating in the portrait mode has been described in FIG. 6B, similarly, the smart watch 1000b may operate in the landscape mode like the smart watch 15 of FIG. 1B and may be also implemented with a circular-shaped smart watch similar to the smart watch 16 of FIG. 1B.

According to an embodiment of the disclosure, even though the electronic device 1000 operates in the sleep mode, the DDI 100 may operate in itself to provide useful information to a user. According to one example, since the partial image data are sequentially modified in a specified sequence and provided, a user may effectively receive useful information. In addition, since the DDI 100 operates in itself to dynamically provide the partial image data, the effect similar to that of a video may be achieved without driving the processor. In addition, a persistence effect caused by keeping the operation of a pixel for a long time may be restrained.

Figure 7:
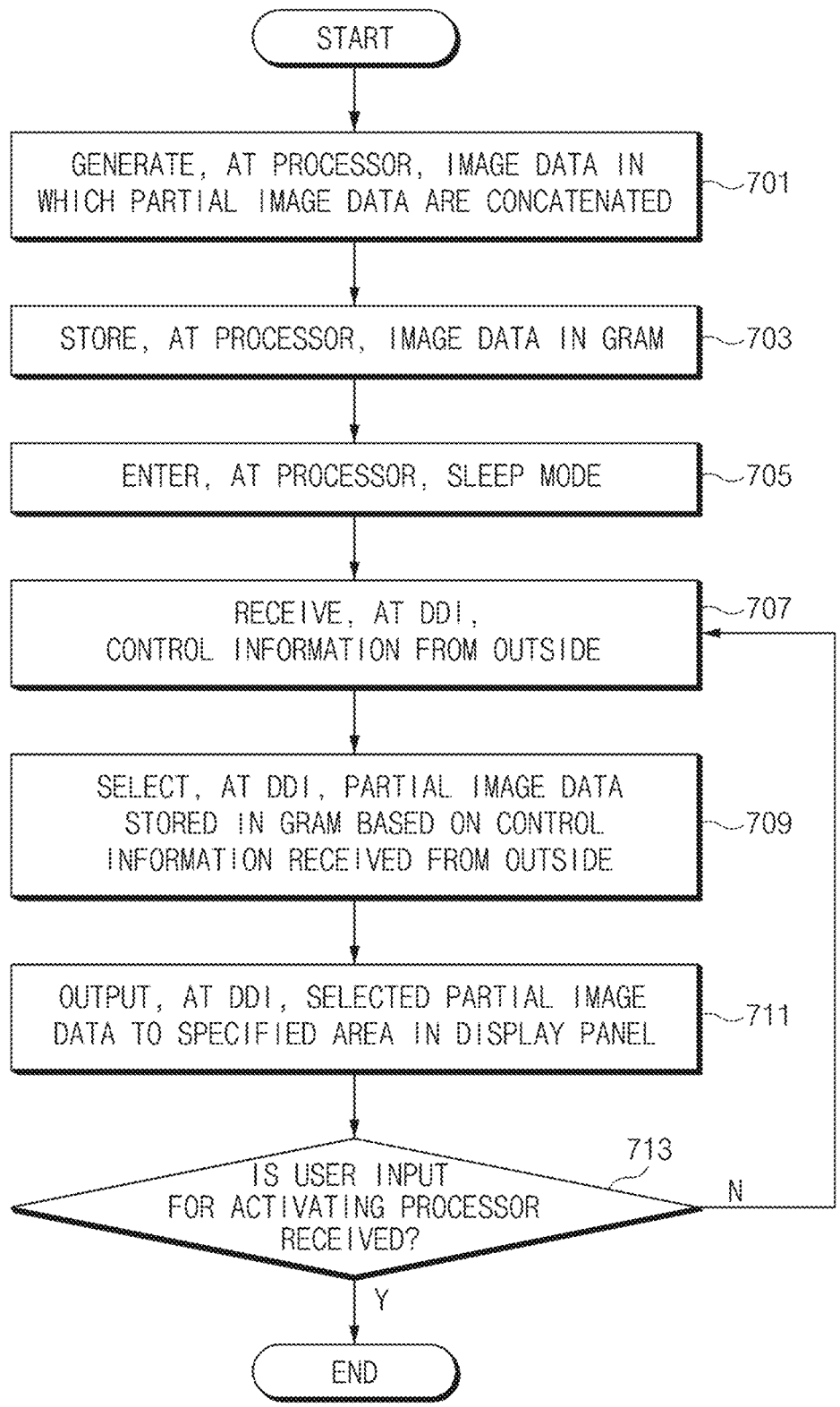
FIG. 7 is a flowchart illustrating a process of providing image data based on control information according to an embodiment of the present disclosure.

FIG. 7 is a flowchart illustrating a process of providing image data based on control information according to an embodiment of the present disclosure.

Referring to FIG. 7, the display driving method according to an embodiment of the present disclosure may include operation 701 to operation 713. The display driving method shown in FIG. 7 will be described with reference to FIGS. 8A and 8B. In addition, in the following description, the details of the same elements as those of FIGS. 4 and 5 will be omitted.

In operation 701, the processor (e.g., the AP 300, the CP 400, the sensor hub 500, and/or the touch control IC 600) may generate image data in which the pieces of partial image data are concatenated with each other. For example, the processor of the smartphone 1000c shown in FIG. 8A may generate image data 800. The image data 800 may include pieces of partial image data as well as partial image data 801 to 808. The pieces of partial image data may include a predefined digit, a text, an alphabet, a weather symbol, a sign, or the like In operation 703, the processor may store the image data generated in operation 701 in the GRAM 110. For example, the processor of the smartphone 1000c shown in FIG. 8A may store the image data 800 generated in operation 701 in the GRAM 110c. Predetermined data addresses may be allocated to pieces of partial image data included in the image data 800, respectively.

In operation 705, the electronic device (and the processor included in the electronic device) may enter a sleep mode. For example, the processor of the smartphone 1000c shown in FIG. 8A may enter the sleep mode.

In operation 707, the DDI 100 may receive control information from the outside (e.g., the AP 300, the CP 400, the sensor hub 500, or the touch control IC 600). For example, the DDI 100 may receive control information from various types of processors (e.g., the AP 300, the CP 400, the sensor hub 500, or the touch control IC 600) disposed outside the DDI 100 through the LoSSI. However, when the DDI 100 may receive control information from various types of processors, at least a part of the processor may temporarily switch to a wake-up mode to transmit the control information to the controller. The at least a part of the processor may enter the sleep mode again after transmitting the control information.

The control information may include time information such as an hour, a minute, a second and AM/FM, calendar information such as days, months, a year, and solar/lunar, weather information such as a weather condition and temperature, call information such as a caller of a missed call and a phone number of a caller, message information such as a message sender and message content, information about a schedule of a previously registered user, or the like, which is able to be provided by various types of processors (e.g., the AP 300, the CP 400, the sensor hub 500, or the touch control IC 600). According to various embodiments, the various kinds of control information may include information about a data address on the GRAM 110c, and/or a data size.

The control information is not limited to the above example. For example, the control information may include various pieces of information obtained from the inside or the outside of the electronic device (e.g., the smartphone 1000c, or the like).

Figure 8A:
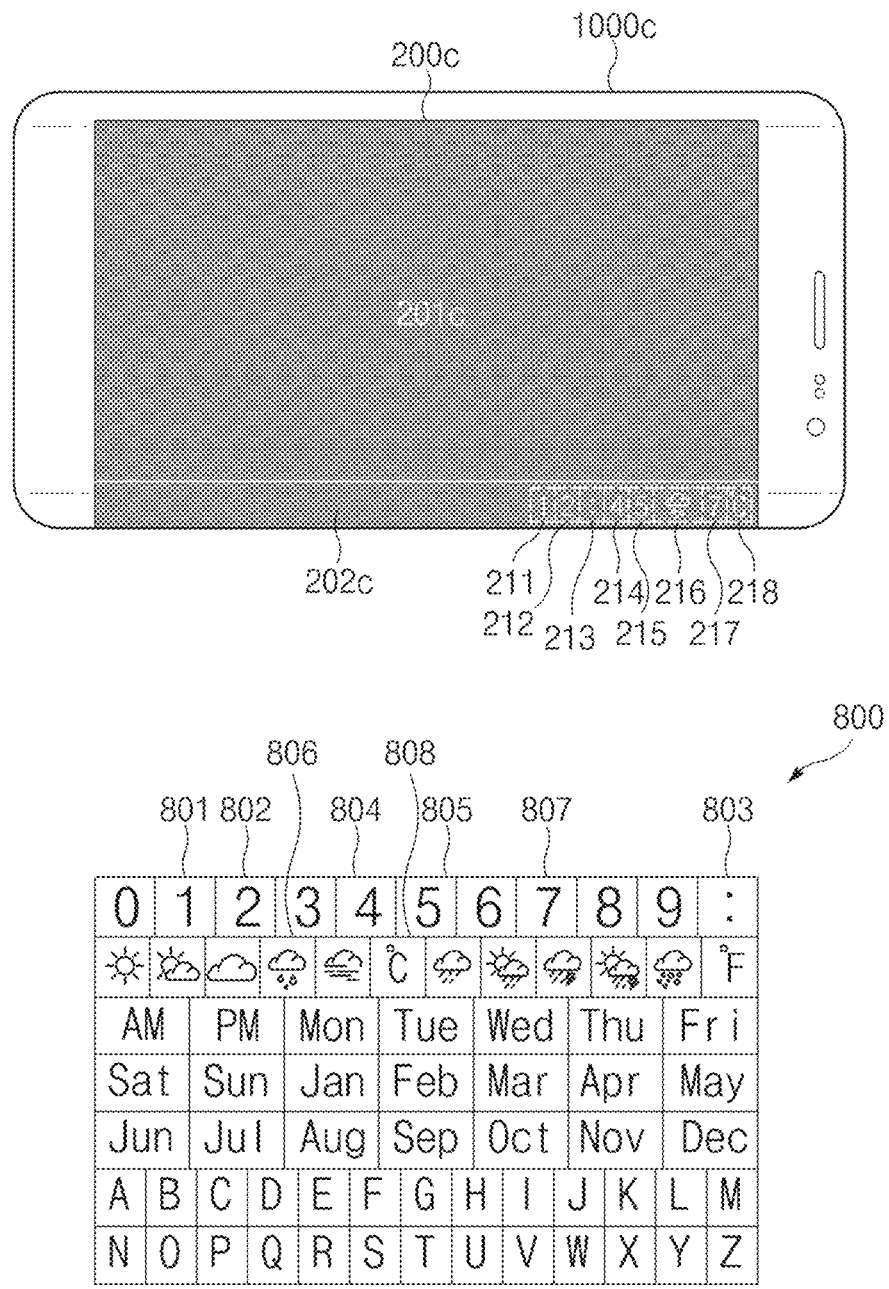
FIG. 8A illustrates an example in which a display driving method is applied to a smartphone, according to an embodiment of the present disclosure.
Figure 8B:
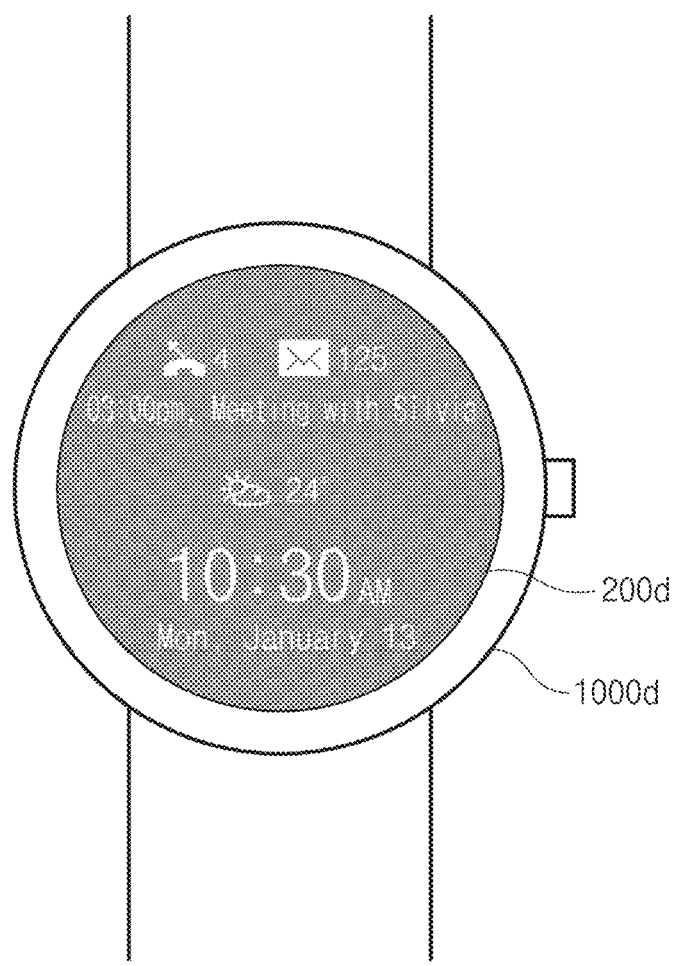
FIG. 8B illustrates an example in which a display driving method is applied to a smart watch, according to an embodiment of the present disclosure.

For example, referring to FIG. 8A, the DDI 100 of the smartphone 1000c may receive control information about the current time from the CP 400 and control information about weather from the AP 300. In addition, for example, the DDI 100 may receive control information about temperature from the sensor hub 400 and control information about a touch gesture from the touch control IC 600.

In addition, according to various embodiments, the various kinds of control information may be obtained from other electronic devices (e.g., a server, another smartphone, a wearable device, a wireless input device, or the like) electrically connected to the electronic device (e.g., the smartphone 1000*c*). That is, the device capable of providing the control information is not limited to a module mounted on the inside of the electronic device.

In operation 709, the DDI 100 may select at least one piece of the partial image data stored in the GRAM 110*c* based on the control information received in operation 707 by using a data address and/or a data size.

For example, referring to FIG. 8A, the DDI 100 may select the partial image data 801 to 805 stored in the GRAM 110*c* according to the control information about a current time. In addition, the DDI 100 may select the partial image data 806 according to the control information about weather and may select the partial image data 807 and 808 according to the control information about temperature.

In operation 711, the DDI 100 may output the partial image data selected in operation 709 to a specified area in the display panel 200.

For example, referring to FIG. 8A, the DDI 100 of the smartphone 1000*c* may output the partial image data 801 to 808 selected in operation 709 to the specified area in the display panel 200*c*. According to one example, the display panel 200*c* may include a main display panel area 201*c* and a curved display panel area 202*c*. Partial images 211 to 218, which correspond to the selected partial image data 801 to 808, respectively, may be output to the curved display panel area 202*c*. According to an embodiment, the partial image data may be dynamically output.

In operation 713, the electronic device 1000 may determine whether a user input for activating the processor is received. That is, the electronic device 1000 may determine whether a user input for allowing the electronic device 1000 to switch from the sleep mode to the wake-up mode is received. When the user input is received, the electronic device may terminate the display driving method according to an embodiment of the present disclosure and the mode may switch to the wake-up mode. To the contrary, when the user input is not received, the electronic device may return to operation 707 to repeat the operation 707 to operation 711.

Meanwhile, the display driving method shown in FIG. 7 may be applied to a smart watch. For example, referring to FIG. 8B, the DDI 100 of the smart watch 1000*d* may receive predetermined control information from the AP 300, the CP 400, the sensor hub 500, or the touch control IC 600 embedded in the smart watch 1000*d*, and may output the (partial) image data corresponding to the control information to the specified area of the display panel 200*d*. Images concerned with a missed call, a received message, a schedule of a user, weather, temperature, a current time, a date, or the like, may be output to the display panel 200*d* of the smart watch 1000*d*.

According to various embodiments of the disclosure, even though the electronic device 1000 operates in the sleep mode, the DDI 100 may operate in itself to provide useful information to a user. Since the partial image data corresponding to the useful information is selected based on the control information received from another module (e.g., the AP 300, the CP 400, the sensor hub 500, or the touch control IC 600), the electronic device 1000 may more dynamically provide useful information to a user.

Figure 9:
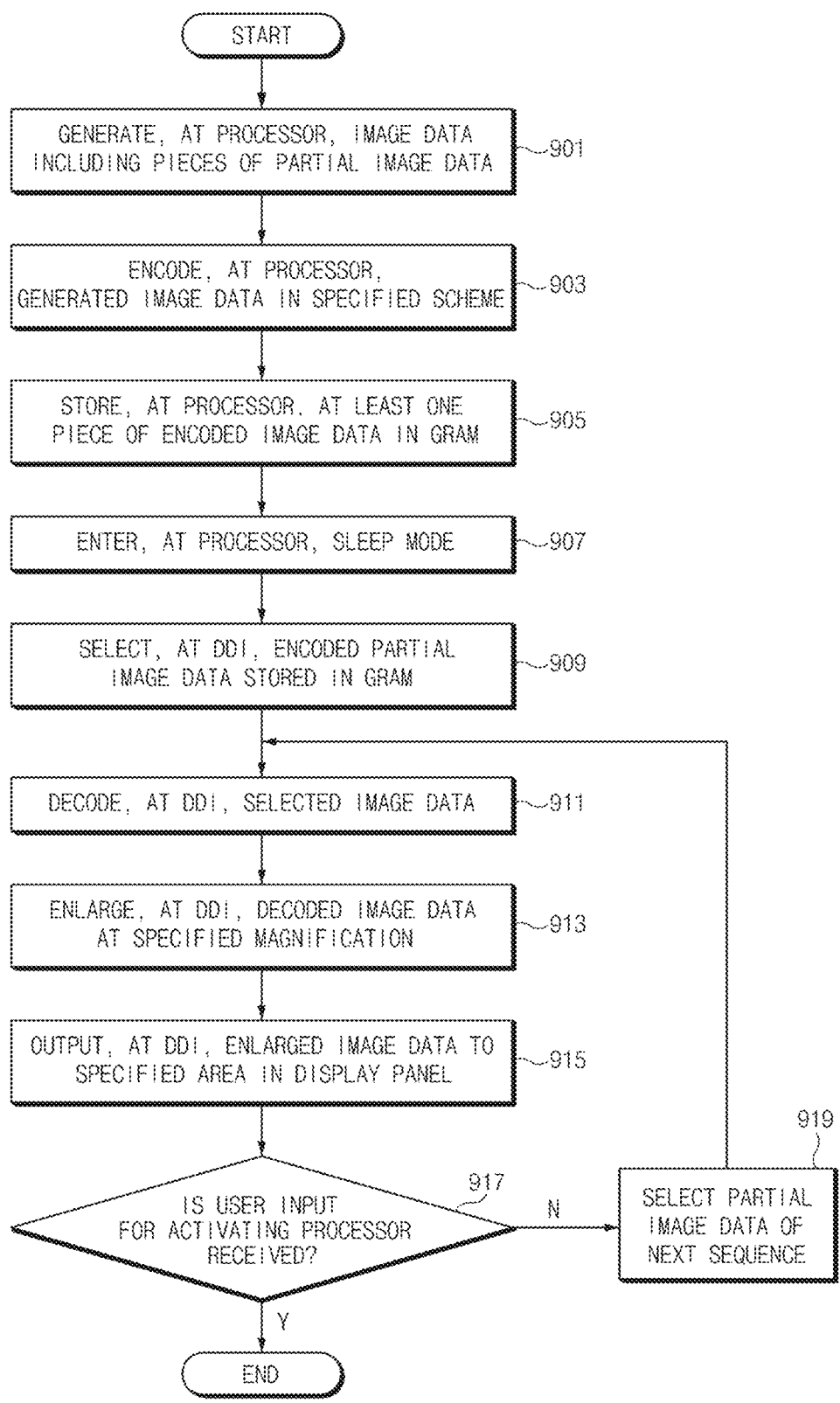
FIG. 9 illustrates an output of image data, according to an embodiment of the present disclosure.

FIG. 9 illustrates how image data is provided, according to an embodiment of the present disclosure.

Referring to FIG. 9, a display driving method according to an embodiment of the present disclosure may include operation 901 to operation 919. FIGS. 9 and 10 are alternately used when each of the operations of FIG. 9 is described, and the description of FIG. 9 may be given by using the reference numerals of FIG. 3B.

In operation 901, the processor 300*b* may generate image data to which pieces of partial image data are concatenated. For example, referring to FIG. 10, image data 1010 that the processor 300*b* generates may include pieces of low-resolution image data 1011 to 1014, the resolution of which is lower than the resolution (WQHD 1440×2560) of the display panel 200*b*. The pieces of low-resolution image data 1011 to 1014 may have a resolution of HD (720×1280). The image data 1011 may include a first group of partial image data 1011-1 including a digital clock image and a second group of partial image data 1011-2 for animation. Similarly, the pieces of image data 1012, 1013, and 1014 may include a first group of partial image data 1012-1, 1013-1, and 1014-1 including the digital clock image and a second group of partial image data 1012-1, 1013-1, and 1014-1 for animation, respectively.

In operation 903, the processor 300*b* may encode the image data generated in operation 901, in a specified scheme (e.g., DSC scheme specified by VESA). For example, referring to FIG. 10, the processor 200*b* may generate encoded image data 1020 by encoding the image data 1010. For example, the data size of the image data 1020 encoded by the processor 300*b* may be reduced to ¼ of the image data 1010.

In operation 905, the processor 300*b* may store the image data encoded in operation 903, in the GRAM 110*b* of the DDI 100*b*. For example, referring to FIG. 10, the processor may store the image data encoded in operation 903, in the GRAM 110*b* of the DDI 100*b*. As well as including the encoded image data 1020, four pieces of encoded image data may be stored in a data space 1030 of the GRAM 110*b*. Each of the four pieces of encoded image data 1030 and partial image data which is included in each of the four pieces of encoded image data 1030 may be allocated to predetermined data addresses, respectively.

In operation 907, the processor 300*b* may enter a sleep mode. That is, the processor 300*b* does not participate in the operation of the DDI 100 after storing the encoded image data 1020 in the GRAM 110*b* of the DDI 100*b* (other than the transmitting of control information for selecting a part of image data).

In operation 909, the DDI 100*b* may select a part of the encoded image data stored in the GRAM 110*b*. For example, the DDI 100*b* may select a part of the encoded image data stored in the GRAM 110*b*, based on the control information received from the processor 300*b* or a specified sequence. For example, referring to FIG. 10, the DDI 100*b* may select a part 1031 or 1032 of the encoded image data stored in the data space 1030 of the GRAM 110*b*. For example, the selected part 1031 may correspond to data in which the first group of partial image data 1011-1 is encoded, and the selected part 1032 may correspond to data in which one partial image data among the second group of partial image data 1011-2 is encoded.

In operation 911, the DDI 100*b* may decode a part of the image data selected in operation 909. For example, referring to FIG. 10, the DDI 100*b* may decode each of the parts 1031 and 1032 of image data selected in operation 909. Partial image data 1041 and partial image data 1042 may be generated by the decoding.

In operation 913, the DDI 100*b* may enlarge the image data decoded in operation 911 at a specified magnification.

For example, referring to FIG. 10, the DDI 100b may enlarge each of the partial image data 1041 and the partial image data 1042, which are decoded in operation 911, four times (twice in width and twice in height). Partial image data 1051 and partial image data 1052 may be generated by the enlargement.

In operation 915, the DDI 100b may output the image data enlarged in operation 913 to a specified area in the display panel 200b. For example, referring to FIG. 10, the DDI 100b may output the partial image data 1051 enlarged in operation 913 to a first area 1061 of an output area 1060 in the display panel 200b and may output the enlarged partial image data 1052 to a second area 1062 of the output area 1060 in the display panel 200b.

In operation 917, the processor 300b may determine whether a user input for activating the processor 300b is received. That is, the electronic device 1000 may determine whether a user input for allowing the electronic device 1000 to switch from the sleep mode to the wake-up mode is received. When the user input is received, the electronic device may terminate the display driving method according to an embodiment of the present disclosure and the mode may switch to the wake-up mode. If being switched to the wake-up mode, for example, the processor 300b may output a lock screen or a home screen to the display panel 200b. On the other hand, in the case where the user input is not received, the processor 300b may perform operation 919.

In operation 919, since the user input for activating the processor 300b is not received, the DDI 100b may select the partial image data of the next sequence. For example, the DDI 100b may select the partial image data of the next sequence, depending on a preset sequence, the control information received from the processor 300b, or a random sequence. Since the operation 919 is performed at a specified period (e.g., a period that a user sets), a specific animation effect may be achieved on the display panel 200b.

According to an embodiment illustrated in FIGS. 9 and 10, since the encoded image data is stored in the GRAM 110b, image data, the resolution of which is greater than n times (four times in the case of FIG. 10) may be stored in the GRAM 110b, compared with the case where an encoding operation is not performed.

In addition, the processor 300b may combine (or concatenate) and generate 'm' pieces of image data having a resolution that is 1/m of the resolution of the display panel 200b. Accordingly, compared with the case where an image (refer to FIGS. 6A and 8A) having the same resolution as the resolution of the display panel 200b is generated, an image, the number of which is 'm' times (four times in the case of FIG. 10) greater than that of the image having the same resolution may be stored in the GRAM 110b.

As a result, according to the embodiment illustrated in FIGS. 9 and 10, for example, compared with the case of FIGS. 6A and 8A, the image integration of the GRAM 110b may increase 16 times (four times*four times). Since the GRAM 110b stores data, the image integration of which is greater than 16 times, at a time, the processor 300b may be maintained in a sleep mode during a time period that is 16 times longer than a time period in the case of FIGS. 6A and 8A. As such, for the processor 300b to write the image data in the GRAM 110b, since a frequency at which the mode of the processor 300b is switched to a wake-up mode decreases, the power consumption of the battery may be more saved.

Meanwhile, according to an embodiment illustrated in FIGS. 9 and 10, in operation 901, the pieces of low-resolution image data 1011 to 1014, the resolution each of which is lower than the resolution (WQHD 1440×2560) of the display panel 200b may be included in the image data 1010 in the concatenated form. However, embodiments are not limited thereto. For example, as illustrated in FIG. 6A or 8A, the image data 1010 may have a resolution corresponding to the resolution of the display panel 200b. For example, the image data 1011 in which the first group of partial image data 1011-1 and the second group of partial image data 1011-2 are included (or concatenated) may be generated to have the same resolution as the resolution (WQHD 1440×2560) of the display panel 200b. In this case, image enlarged in operation 913 by the DDI 100b may be skipped.

Furthermore, according to an embodiment illustrated in FIGS. 9 and 10, in operation 903, it is described that the image data 1010 is encoded by the processor 300b. However, embodiments are not limited thereto. For example, the encoding in operation 903 and the decoding in operation 911 corresponding to the encoding may be skipped. For example, the image data 1010 may be stored in the GRAM 110b while not encoded.

Figure 11:
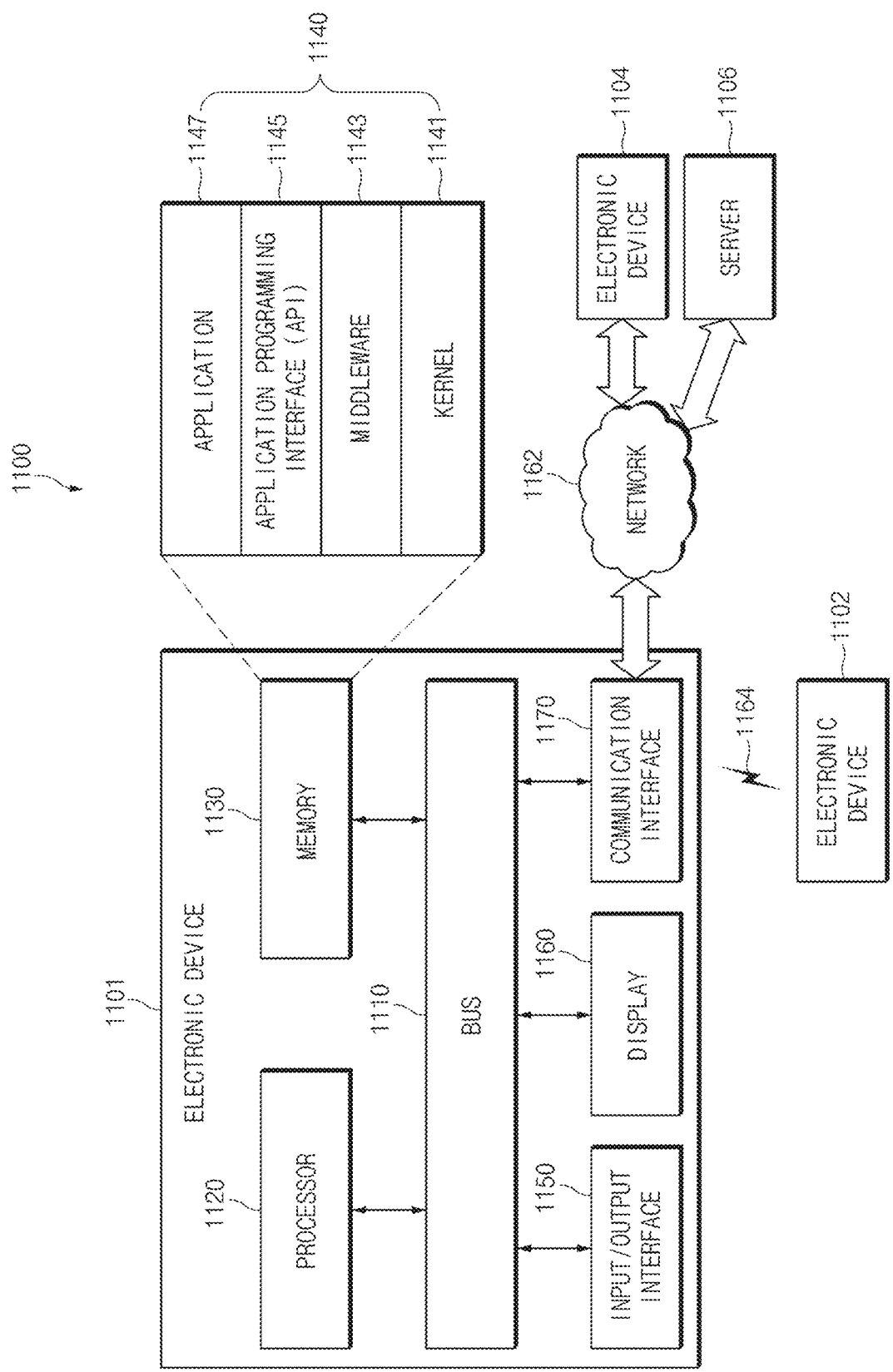
FIG. 11 is a diagram illustrating an electronic device, according to various embodiments of the present disclosure.

FIG. 11 illustrates an electronic device 1101 in a network environment 1100, according to various embodiments.

Referring to FIG. 11, the electronic device 1101 may include a bus 1110, a processor 1120, a memory 1130, an input/output interface 1150, a display 1160, and a communication interface 1170. According to an embodiment, the electronic device 1101 may not include at least one of the elements or may further include other element(s).

For example, the bus 1110 may interconnect the above-described elements 1110 to 1170 and may be included in a circuit for conveying communications (e.g., a control message and/or data) among the above-described elements.

The processor 1120 may include one or more of a central processing unit (CPU), an application processor (AP: for example, the AP 300 of FIG. 2), or a communication processor (CP: for example, the CP 400 of FIG. 2). For example, the processor 1120 may perform an arithmetic operation or data processing associated with control and/or communication of at least other elements of the electronic device 1101.

The memory 1130 may include a volatile and/or nonvolatile memory. For example, the memory 1130 may store instructions or data associated with at least one other element(s) of the electronic device 1101. According to an embodiment, the memory 1130 may store software and/or a program 1140. The program 1140 may include, for example, a kernel 1141, a middleware 1143, an application programming interface (API) 1145, and/or an application program (or an application) 1147. At least a part of the kernel 1141, the middleware 1143, or the API 1145 may be called an "operating system (OS)".

The input/output interface 1150 may transmit, for example, an instruction or data input from a user or another external device to other element(s) of the electronic device 1101 as an interface.

The display 1160 may display, for example, various contents (e.g., a text, an image, a video, an icon, a symbol, or the like) to a user. For example, the display 1160 may include the display driver circuit 100, the display panel 200, the touch controller IC 600 and the touch panel 610 as shown in FIG. 2. The display 1160 may receive, for example, a touch, gesture, proximity, or hovering input using an electronic pen or a part of a user's body.

For example, the communication interface 1170 may establish communication between the electronic device 1101 and an external device (e.g., the first and second external electronic devices 1102 and 1104, or a server 1106). For example, the communication interface 1170 may be connected to a network 1162 through wireless communication or wired communication to communicate with an external device (e.g., the second external electronic device 1104 or the server 1106). For example, the communication interface 1170 may communicate with an external device (e.g., the first external electronic device 1102) through a local communication network 1164.

Each of the first and second external devices 1102 and 1104 may be a device of which the type is different from or the same as that of the electronic device 1101. According to an embodiment, the server 1106 may include a group of one or more servers.

Figure 12:
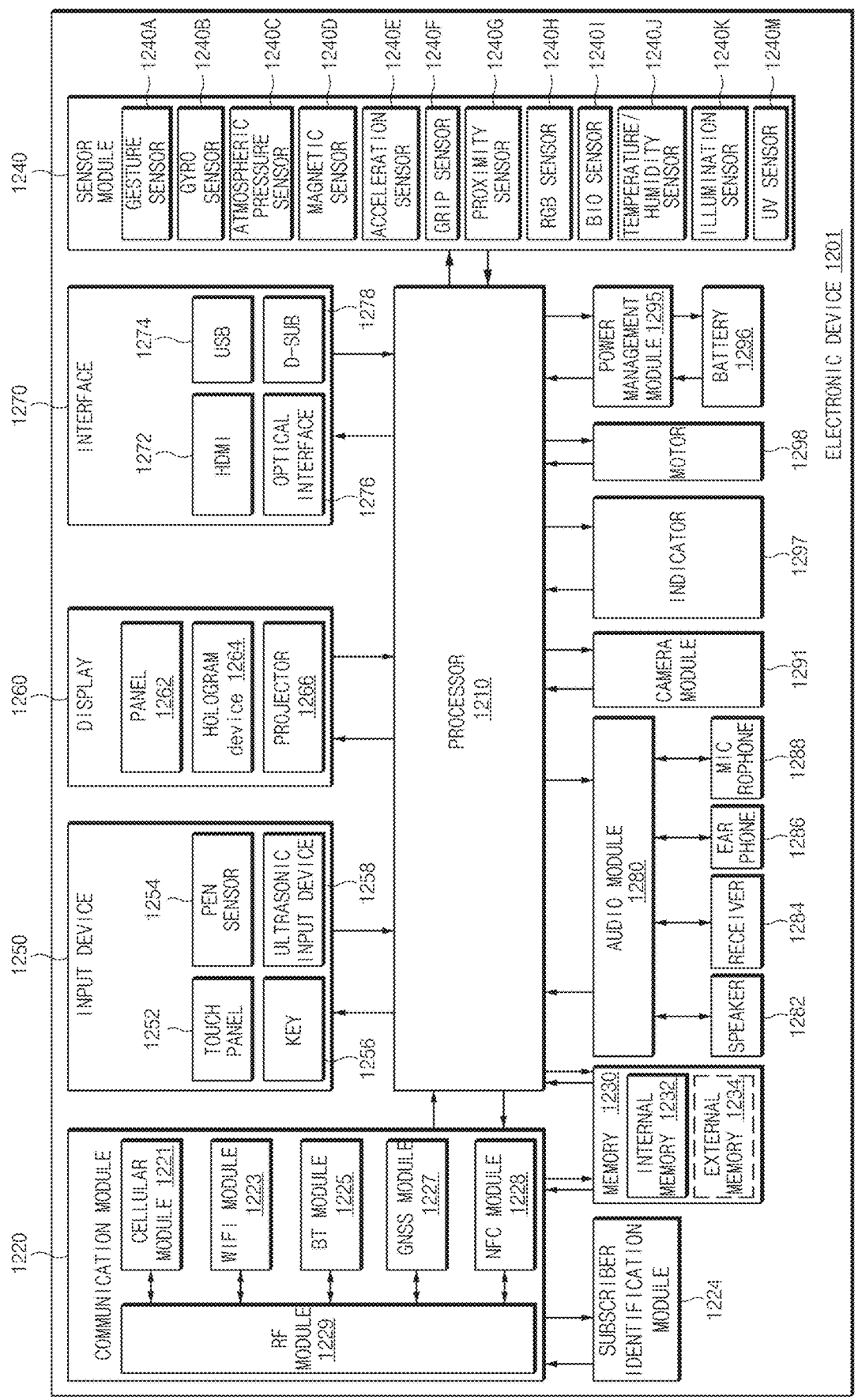
FIG. 12 illustrates a block diagram of an electronic device, according to various embodiments of the present disclosure.

FIG. 12 is a block diagram illustrating an electronic device 1201 according to various embodiments.

Referring to FIG. 12, an electronic device 1201 may include, for example, all or a part of an electronic device illustrated in FIG. 11. The electronic device 1201 may include one or more processors (e.g., the AP 300 and the CP 400 of FIG. 2) 1210, a communication module 1220, a subscriber identification module 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 (e.g., the AP 300 and the CP 400 of FIG. 2) may drive, for example, an operating system (OS) or an application to control a plurality of hardware or software elements connected to the processor 1210 and may process and compute a variety of data. The processor 1210 may be implemented with a System on Chip (SoC), for example. According to an embodiment, the processor 1210 may further include a graphic processing unit (GPU) and/or an image signal processor. The processor 1210 may load an instruction or data, which is received from at least one of other elements (e.g., a nonvolatile memory) to a volatile memory (e.g., the GRAM 110 of FIG. 2) to process it, and may store various data at a nonvolatile memory.

The communication module 1220 may have a configuration that is the same as or similar to the communication interface 1170 of FIG. 11. For example, the communication module 1220 may include a cellular module 1221, a Wi-Fi module 1223, a Bluetooth (BT) module 1225, a GNSS module 1227 (e.g., a GPS module, a Glonass module, a Beidou module, or a Galileo module), a near field communication (NFC) module 1228, and a radio frequency (RF) module 1229.

For example, the cellular module 1221 may provide voice communication, video communication, a text service, an Internet service, or the like through a communication network. According to an embodiment, the cellular module 1221 may perform at least a part of functions that the processor 1210 provides. According to an embodiment, the cellular module 1221 may include a communication processor (CP: e.g., the CP 400 of FIG. 2).

Each of the Wi-Fi module 1223, the BT module 1225, the GNSS module 1227, or the NFC module 1228 may include a processor for processing data transmitted/received through a corresponding module, for example. According to an embodiment, at least a part (e.g., two or more elements) of the cellular module 1221, the Wi-Fi module 1223, the BT module 1225, the GNSS module 1227, or the NFC module 1228 may be included within one Integrated Circuit (IC) or an IC package.

The subscriber identification module 1224 may include, for example, a card, including a subscriber identification module and/or an embedded SIM, and may include unique identification information (e.g., integrated circuit card identifier (ICCID)) or subscriber information (e.g., integrated mobile subscriber identity (IMSI)).

For example, the memory 1230 (e.g., the memory 1130 of FIG. 11) may include an internal memory 1232 or an external memory 1234. The external memory 1234 may be functionally and/or physically connected to the electronic device 1201 through various interfaces.

The sensor module 1240 may measure, for example, a physical quantity or may detect an operation state of the electronic device 1201. The sensor module 1240 may convert the measured or detected information to an electric signal. The sensor module 1240 (e.g., the sensors 510 and 520 of FIG. 2) may include at least one of a gesture sensor 1240A, a gyro sensor 1240B, a barometric sensor 1240C, a magnetic sensor 1240D, an acceleration sensor 1240E, a grip sensor 1240F, a proximity sensor 1240G, a color sensor 1240H (e.g., red, green, blue (RGB) sensor), a biometric sensor 1240I, a temperature/humidity sensor 1240J, an illuminance sensor 1240K, or an UV sensor 1240M. The sensor module 1240 may further include a control circuit (e.g., the sensor hub of FIG. 2) for controlling at least one or more sensors included therein. According to an embodiment, the electronic device 1201 may further include a processor which is a part of the processor 1210 or independent of the processor 1210 and is configured to control the sensor module 1240. The processor may control the sensor module 1240 while the processor 1210 is in the sleep state.

The input device 1250 may include, for example, a touch panel (e.g., the touch panel 610 of FIG. 2) 1252, a (digital) pen sensor 1254, a key 1256, or an ultrasonic input unit 1258. The touch panel 1252 may use, for example, at least one of capacitive, resistive, infrared, or ultrasonic detecting methods. Also, the touch panel 1252 may further include a control circuit (e.g., the touch control IC 600 of FIG. 2). The touch panel 1252 may further include a tactile layer to provide a tactile reaction to a user.

The display 1260 may include a panel (e.g., the display panel 200 of FIG. 2) 1262, a hologram device 1264, or a projector 1266. The panel 1262 (e.g., the display panel 200 of FIG. 2) may be configured to have the same as or similar to a display 1160 of FIG. 11. The panel 1262 may be implemented to be flexible, transparent or wearable, for example. The panel (e.g., the display panel 200 of FIG. 2) 1262 may include a touch panel (e.g., the touch panel 610 of FIG. 2) 1252 and one module. The hologram device 1264 may display a stereoscopic image in a space using a light interference phenomenon. The projector 1266 may project light onto a screen so as to display an image. The screen may be arranged, for example, in the inside or the outside of the electronic device 1201. According to an embodiment, the display 1260 may further include a control circuit (e.g., the display driver circuit 100 of FIG. 2 or 3) for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in the communication interface 1170 illustrated in FIG. 11.

For example, the audio module 1280 may convert, for example, a sound and an electric signal in dual directions. At least a part of the audio module 1280 may be included, for example, in an input/output interface 1150 illustrated in FIG. 11. The audio module 1280 may process, for example, sound information that is input or output through a speaker 1282, a receiver 1284, an earphone 1286, or a microphone 1288.

According to an embodiment, the camera module 1291 for shooting a still image or a video may include, for example, at least one image sensor (e.g., a front sensor or a rear sensor), a lens, an image signal processor (ISP), or a flash (e.g., an LED or a xenon lamp).

The power management module 1295 may manage, for example, power of the electronic device 1201. According to an embodiment, the power management module 1295 may include a power management integrated circuit (PMIC), a charger IC, or a battery or fuel gauge. The battery 1296 may include, for example, a rechargeable battery and/or a solar battery.

The indicator 1297 may display a specific state of the electronic device 1201 or a portion thereof (e.g., a processor 1210), such as a booting state, a message state, a charging state, and the like. The motor 1298 may convert an electrical signal into a mechanical vibration and may generate the following effects: vibration, haptic, or the like. Even though not illustrated, a processing device (e.g., a GPU) for supporting a mobile TV may be included in the electronic device 1201. The processing device for supporting a mobile TV may process, for example, media data according to the standards of digital multimedia broadcasting (DMB), digital video broadcasting (DVB), MediaFlo™, or the like.

Each of the above-mentioned elements of the electronic device according to the present disclosure may be configured with one or more elements, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

The term "module" used herein may represent, for example, a unit including one or more combinations of hardware, software or firmware. The term "module" may be interchangeably used with the terms "unit", "logic", "logical block", "element" or "circuit". The "module" may be a minimum unit of an integrated element or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), or a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by one or more processors (e.g., the AP 300 of FIG. 2 or the processor 1120 of FIG. 11), may allow the one or more processors to perform a function corresponding to the instruction. The computer-readable storage media, for example, may be the memory 1230.

A computer-readable recording medium may include a hard disk, a floppy disk, a magnetic media (e.g., a magnetic tape), an optical media (e.g., a compact disc read only memory (CD-ROM), a digital versatile disc (DVD), or a magneto-optical media (e.g., a floptical disk)), and a hardware device (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements may be executed by a successive method, a parallel method, a repeated method, or a heuristic method according to various embodiments. Also, some of operations may be executed in different sequences, omitted, or other operations may be added. While the present disclosure has been shown and described with reference to various embodiments thereof, it will be understood by those skilled in the art that various changes in form and details may be made therein without departing from the spirit and scope of the present disclosure as defined by the appended claims and their equivalents.

We claim:

1. An electronic device comprising:
a display including a display area;
at least one processor configured to:
generate an image data by concatenating a plurality of low-resolution partial image pieces having a resolution lower than the resolution of the display, and
encode the image data in a specified scheme;
a graphic random access memory (GRAM) in a display driver integrated circuit configured to store the encoded image data while the at least one processor is in a sleep mode; and
the display driver integrated circuit for driving the display,
wherein the display driver integrated circuit is configured to:
select at least one of the plurality of low-resolution partial image piece of the encoded image data,
decode the selected at least one partial image piece,
display the decoded at least one partial image piece to the display area of the display, and
display the plurality of low-resolution partial image pieces one by one on a portion of the display area depending on a specified sequence, while the at least one processor is in the sleep mode.

2. The electronic device of claim 1,
wherein the at least one processor is further configured to:
enter the sleep mode after generating the image data, and
wherein the display driver integrated circuit is further configured to:
output the plurality of low-resolution partial image pieces one by one to the display area depending on the specified sequence by an operation of the display driver integrated circuit in itself.

3. The electronic device of claim 1, wherein the at least one processor includes at least one of an application processor (AP), a communication processor (CP), a sensor hub, or a touch controller integrated circuit (IC).

4. The electronic device of claim 1, wherein the display driver integrated circuit is further configured to:
output the plurality of low-resolution partial image pieces one by one to the display area depending on the specified sequence, by using at least one of a data address on the GRAM of each of the plurality of low-resolution partial image pieces or a data size of each of the plurality of low-resolution partial image pieces.

5. The electronic device of claim 1, wherein each of the plurality of low-resolution partial image pieces displayed on the display area to move from one side of the display area to the other side.

6. The electronic device of claim 1, wherein the display driver integrated circuit is further configured to:
output the plurality of low-resolution partial image pieces one by one to the display area depending on the specified sequence based on control information received from the at least one processor.

7. The electronic device of claim 6, wherein the display driver integrated circuit is further configured to:
receive the control information through a low speed interface.

8. The electronic device of claim 6, wherein at least part of the at least one processor is configured to:
switch to a wake-up mode temporarily to transmit the control information to the display driver integrated circuit.

9. The electronic device of claim 1,
wherein the image data includes a first group of partial image and a second group of partial image, and
wherein the display driver integrated circuit is further configured to:
select at least one partial image piece among the first group of partial image and at least one partial image piece among the second group of partial image, and
output the at least one partial image piece selected among the first group of partial image, to a first display area of the display and output the at least one partial image piece selected among the second group of partial image pieces to a second display area of the display.

10. The electronic device of claim 9, wherein the display driver integrated circuit is configured to:
select one among the second group of partial image depending on the specified sequence.

11. The electronic device of claim 1,
wherein the display driver integrated circuit is further configured to:
select a low-resolution partial image piece among the image data, and
enlarge the selected low-resolution partial image piece at a specified magnification to output the enlarged part to the display area of the display.

12. A display driver integrated circuit for driving a display, comprising:
a graphic random access memory (GRAM) configured to store an encoded image data generated by at least one processor while the at least one processor is in a sleep mode, wherein the image data is generated by concatenating a plurality of low-resolution partial image pieces having a resolution lower than the resolution of the display and encode the image data in a specified scheme;
a controller integrated circuit configured to:
select one of the plurality of low-resolution partial image piece of the encoded image data,
decode the selected low-resolution partial image piece,
display the decoded low-resolution partial image piece to the display area of the display, and
display the plurality of low-resolution partial image pieces one by one on a portion of a display area of the display depending on a specified sequence, while the at least one processor is in the sleep mode; and
a timing controller circuit configured to supply an image signal corresponding to the plurality of low-resolution partial image pieces, to the display,
wherein the controller integrated circuit is further configured to:
control the timing controller circuit such that the plurality of low-resolution partial image pieces are output one by one to the display area.

13. The display driver integrated circuit of claim 12,
wherein the image data includes a first group of partial image and a second group of partial image, and
wherein the controller integrated circuit is further configured to:
select at least one partial image piece among the first group of partial image and at least one partial image piece among the second group of partial image, and
control the timing controller circuit such that the at least one partial image piece selected among the first group of partial image is output to a first display area of the display and such that the at least one partial image piece selected among the second group of partial image is output to a second display area of the display.

14. The display driver integrated circuit of claim 12, further comprising:
a decoder circuit configured to decode data in the specified scheme,
wherein the decoder circuit is further configured to:
decode the selected low-resolution partial image piece to transmit the decoded data to the timing controller circuit.

15. The display driver integrated circuit of claim 12, further comprising:
an up-scaler circuit configured to enlarge an image at a specified magnification,
wherein the up-scaler circuit is further configured to:
enlarge the selected low-resolution partial image piece to transmit the enlarged low-resolution partial image piece to the timing controller circuit.

16. A method of driving a display, the method comprising:
generating, by at least one processor, an image data by concatenating a plurality of low-resolution partial image pieces having a resolution lower than the resolution of the display;
encoding, by at least one processor, the image data in a specified scheme;
storing, by the at least one processor, the encoded image data in a graphic random access memory (GRAM) in a display driver integrated circuit while the at least one processor is in a sleep mode;
selecting, by the display driver integrated circuit, one of the plurality of low-resolution partial image piece of the encoded image data;
decoding, by the display driver integrated circuit, the selected low-resolution partial image piece;
displaying, by the display driver integrated circuit, the decoded low-resolution partial image piece to the display area of the display; and
displaying, by the display driver integrated circuit, the plurality of low-resolution partial image pieces one by one on a portion of a display area of the display depending on a specified sequence, when the at least one processor is in the sleep mode.

\* \* \* \* \*